US008745267B2

(12) United States Patent
Luecke et al.

(10) Patent No.: US 8,745,267 B2
(45) Date of Patent: Jun. 3, 2014

(54) ENHANCEMENT OF UPLOAD AND/OR DOWNLOAD PERFORMANCE BASED ON CLIENT AND/OR SERVER FEEDBACK INFORMATION

(71) Applicant: Box, Inc., Los Altos, CA (US)

(72) Inventors: Ryan Luecke, Menlo Park, CA (US); Jeff Queisser, San Francisco, CA (US); James P. Lyons, San Mateo, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/969,474

(22) Filed: Aug. 16, 2013

(65) Prior Publication Data
US 2014/0052825 A1 Feb. 20, 2014

Related U.S. Application Data

(60) Provisional application No. 61/684,781, filed on Aug. 19, 2012, provisional application No. 61/694,466, filed on Aug. 29, 2012, provisional application No. 61/702,154, filed on Sep. 17, 2012, provisional application No. 61/703,699, filed on Sep. 20, 2012.

(51) Int. Cl.
G06F 15/173 (2006.01)
H04L 12/56 (2006.01)
H04L 29/08 (2006.01)

(52) U.S. Cl.
CPC ............ H04L 45/124 (2013.01); H04L 67/327 (2013.01); H04L 67/1002 (2013.01)
USPC ........................... 709/241; 709/203; 709/219

(58) Field of Classification Search
CPC .. H04L 45/124; H04L 67/327; H04L 67/1002
USPC ......................................................... 709/241
See application file for complete search history.

(56) References Cited

U.S. PATENT DOCUMENTS

| 5,799,320 | A | 8/1998 | Klug |
| 5,848,415 | A | 12/1998 | Guck |
| 5,999,908 | A | 12/1999 | Abelow |
| 6,034,621 | A | 3/2000 | Kaufman |

(Continued)

FOREIGN PATENT DOCUMENTS

| CA | 2724521 | 11/2009 |
| CN | 101997924 A | 3/2011 |

(Continued)

OTHER PUBLICATIONS

"PaperPort Professional 14," PC Mag. Com review, published Feb. 2012, Ziff Davis, Inc., 8 pages.

(Continued)

Primary Examiner — David Lazaro
(74) Attorney, Agent, or Firm — Perksin Coie LLP

(57) ABSTRACT

Systems and methods for providing enhancement of upload and/or download performance based on client and/or server feedback information are disclosed. In an embodiment, the disclosed method detects that a data transfer event is about to occur and based on a set of characteristics associated with the data transfer event, selects a host from a group of hosts as a pathway for transferring data associated with the data transfer event to optimize data transfer performance. The group of hosts can include a server providing cloud-based collaboration and/or storage services, one or more content delivery network servers and/or geographically distributed edge servers.

21 Claims, 18 Drawing Sheets

(56) References Cited

U.S. PATENT DOCUMENTS

| | | |
|---|---|---|
| 6,073,161 A | 6/2000 | DeBoskey et al. |
| 6,233,600 B1 | 5/2001 | Salas et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,385,606 B2 | 5/2002 | Inohara et al. |
| 6,515,681 B1 | 2/2003 | Knight |
| 6,584,466 B1 | 6/2003 | Serbinis et al. |
| 6,636,872 B1 | 10/2003 | Heath et al. |
| 6,662,186 B1 | 12/2003 | Esquibel et al. |
| 6,687,878 B1 | 2/2004 | Eintracht et al. |
| 6,714,968 B1 | 3/2004 | Prust |
| 6,742,181 B1 | 5/2004 | Koike et al. |
| 6,947,162 B2 | 9/2005 | Rosenberg et al. |
| 6,952,724 B2 | 10/2005 | Prust |
| 7,010,752 B2 | 3/2006 | Ly |
| 7,039,806 B1 | 5/2006 | Friedman et al. |
| 7,069,393 B2 | 6/2006 | Miyata et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,222,078 B2 | 5/2007 | Abelow |
| 7,275,244 B1 | 9/2007 | Bell et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,650,367 B2 | 1/2010 | Arruza |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,937,663 B2 | 5/2011 | Parker et al. |
| 7,958,453 B1 | 6/2011 | Taing |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,117,261 B2 | 2/2012 | Briere et al. |
| 8,140,513 B2 | 3/2012 | Ghods et al. |
| 8,185,830 B2 | 5/2012 | Saha et al. |
| 8,230,348 B2 | 7/2012 | Peters et al. |
| 8,347,276 B2 | 1/2013 | Schadow |
| 8,464,161 B2 | 6/2013 | Giles et al. |
| 2001/0027492 A1 | 10/2001 | Gupta |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0181579 A1 | 9/2004 | Huck et al. |
| 2004/0230624 A1 | 11/2004 | Frolund et al. |
| 2004/0246532 A1 | 12/2004 | Inada |
| 2005/0005276 A1 | 1/2005 | Morgan |
| 2005/0022229 A1 | 1/2005 | Gabriel et al. |
| 2005/0050228 A1 | 3/2005 | Perham et al. |
| 2005/0063083 A1 | 3/2005 | Dart et al. |
| 2005/0114305 A1 | 5/2005 | Haynes et al. |
| 2005/0114378 A1 | 5/2005 | Elien et al. |
| 2005/0198299 A1 | 9/2005 | Beck et al. |
| 2005/0198452 A1 | 9/2005 | Watanabe |
| 2005/0234943 A1 | 10/2005 | Clarke |
| 2005/0261933 A1 | 11/2005 | Magnuson |
| 2006/0026502 A1 | 2/2006 | Dutta |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0100830 A1 | 5/2007 | Beedubail et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0126635 A1 | 6/2007 | Houri |
| 2007/0198609 A1 | 8/2007 | Black et al. |
| 2007/0208878 A1 | 9/2007 | Barnes-Leon et al. |
| 2007/0220016 A1 | 9/2007 | Estrada et al. |
| 2007/0256065 A1 | 11/2007 | Heishi et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0104277 A1 | 5/2008 | Tian |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0183467 A1 | 7/2008 | Yuan et al. |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0263099 A1 | 10/2008 | Brady-Kalnay et al. |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0198772 A1 | 8/2009 | Kim et al. |
| 2009/0210459 A1 | 8/2009 | Nair et al. |
| 2009/0235167 A1 | 9/2009 | Boyer et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0300527 A1 | 12/2009 | Malcolm et al. |

(56) References Cited

U.S. PATENT DOCUMENTS

| | | |
|---|---|---|
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0093310 A1 | 4/2010 | Gbadegesin et al. |
| 2010/0131868 A1 | 5/2010 | Chawla et al. |
| 2010/0151431 A1 | 6/2010 | Miller |
| 2010/0162365 A1 | 6/2010 | Del Real |
| 2010/0179940 A1 | 7/2010 | Gilder et al. |
| 2010/0185463 A1 | 7/2010 | Noland et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0257457 A1 | 10/2010 | De Goes |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0306379 A1 | 12/2010 | Ferris |
| 2010/0322252 A1 | 12/2010 | Suganthi et al. |
| 2010/0325155 A1 | 12/2010 | Skinner et al. |
| 2010/0325655 A1 | 12/2010 | Perez |
| 2011/0016409 A1 | 1/2011 | Grosz et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0047413 A1 | 2/2011 | McGill et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0119313 A1 | 5/2011 | Sung et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0238458 A1 | 9/2011 | Purcell et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0258561 A1 | 10/2011 | Ladouceur et al. |
| 2011/0282710 A1 | 11/2011 | Akkiraju et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0072436 A1 | 3/2012 | Pierre et al. |
| 2012/0079095 A1 | 3/2012 | Evans et al. |
| 2012/0117626 A1 | 5/2012 | Yates et al. |
| 2012/0124547 A1 | 5/2012 | Halbedel |
| 2012/0130900 A1 | 5/2012 | Tang et al. |
| 2012/0136936 A1 | 5/2012 | Quintuna |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0218885 A1 | 8/2012 | Abel et al. |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0317239 A1 | 12/2012 | Mulder et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0013560 A1 | 1/2013 | Goldberg et al. |
| 2013/0014023 A1 | 1/2013 | Lee et al. |
| 2013/0055127 A1 | 2/2013 | Saito et al. |
| 2013/0080919 A1 | 3/2013 | Kiang et al. |
| 2013/0138608 A1 | 5/2013 | Smith |
| 2013/0159411 A1 | 6/2013 | Bowen |
| 2013/0163289 A1 | 6/2013 | Kim et al. |
| 2013/0191339 A1 | 7/2013 | Haden et al. |
| 2013/0262862 A1 | 10/2013 | Hartley |
| 2013/0268480 A1 | 10/2013 | Dorman |
| 2013/0275398 A1 | 10/2013 | Dorman et al. |
| 2013/0275429 A1 | 10/2013 | York et al. |
| 2013/0275509 A1 | 10/2013 | Micucci et al. |

FOREIGN PATENT DOCUMENTS

| | | |
|---|---|---|
| CN | 102264063 A | 11/2011 |
| EP | 0921661 A2 | 6/1999 |
| EP | 1528746 A2 | 5/2005 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2008011142 A2 | 1/2008 |
| WO | WO-2008076520 A2 | 6/2008 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |

(56) References Cited

FOREIGN PATENT DOCUMENTS

OTHER PUBLICATIONS

"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Patent Court Document of Approved Judgment for GB0602349.3 and GB0623571.7; Mar. 3, 2009, 17 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
Exam Report for GB1310666.1, Applicant: Box, Inc. Mailed Aug. 30, 2013, 10 pages.
Exam Report for GB1313559.5, Applicant: Box, Inc., Mailed Aug. 22, 2013, 19 pages.
Google Docs, http://web.Archive.org/web/20100413105758/http://en.wikipedia.org/wiki/Google_docs, Apr. 13, 2010, 6 pages.
International Search Report and Written Opinion for PCT/US2008/012973 dated Apr. 30, 2009, pp. 1-11.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/070366, Applicant: Box, Inc., Mailed Apr. 24, 2013, 10 pages.
International Search Report and Written Opinion for PCT/US2013/020267, Applicant: Box, Inc., Mailed May 7, 2013, 10 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
International Search Report and Written Opinion for PCT/US2013/039782, Applicant: Box, Inc., Mailed Aug. 28, 2013, 15 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Coiiaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
Burns, "Developing Secure Mobile Applications for Android," Oct. 2008, Version 1.0, 1-28 pages.
Exam Report for GB1308842.2, Applicant: Box, Inc. Mailed Mar. 10, 2014, 4 pages.
Exam Report for GB1314771.5, Applicant: Box, Inc. Mailed Feb. 17, 2014, 7 pages.

ENHANCEMENT OF UPLOAD AND/OR DOWNLOAD PERFORMANCE BASED ON CLIENT AND/OR SERVER FEEDBACK INFORMATION

CROSS-REFERENCE TO RELATED APPLICATIONS AND EFFECTIVE FILING DATE ENTITLEMENT

The present application claims priority to and benefit from U.S. Provisional Patent Application Ser. No. 61/684,781 titled "Client and/or Server Feedback Information Enabled Real Time or Near Real Time Optimization and Enhancement of Upload/Download Performance and User Experience", filed on Aug. 19, 2012; U.S. Provisional Patent Application Ser. No. 61/694,466 titled "Optimizations for Client and/or Server Feedback Information Enabled Real Time or Near Real Time Enhancement of Upload/Download Performance", filed on Aug. 29, 2012; U.S. Provisional Patent Application Ser. No. 61/702,154 titled "Optimizations for Client and/or Server Feedback Information Enabled Real Time or Near Real Time Enhancement of Upload/Download Performance", filed on Sep. 17, 2012; and U.S. Provisional Patent Application Ser. No. 61/703,699 titled "Optimizations for Client and/or Server Feedback Information Enabled Real Time or Near Real Time Enhancement of Upload/Download Performance", filed on Sep. 20, 2012. The content of each of the aforementioned applications is hereby incorporated by reference in their entirety. This application is therefore entitled to an effective filing date of Aug. 19, 2012.

BACKGROUND

Many users upload/download files to/from file sharing and/or storage services. The upload/download can take a long time depending on the size of the files being uploaded or downloaded and/or the location of the servers of the file sharing and/or storage services. The upload/download speed can be improved in some instances by using acceleration services provided by content delivery networks. However, uploading/downloading via the content delivery networks is not always faster than uploading/downloading directly to the servers of the file sharing and/or storage services.

DETAILED DESCRIPTION

Figure 1:
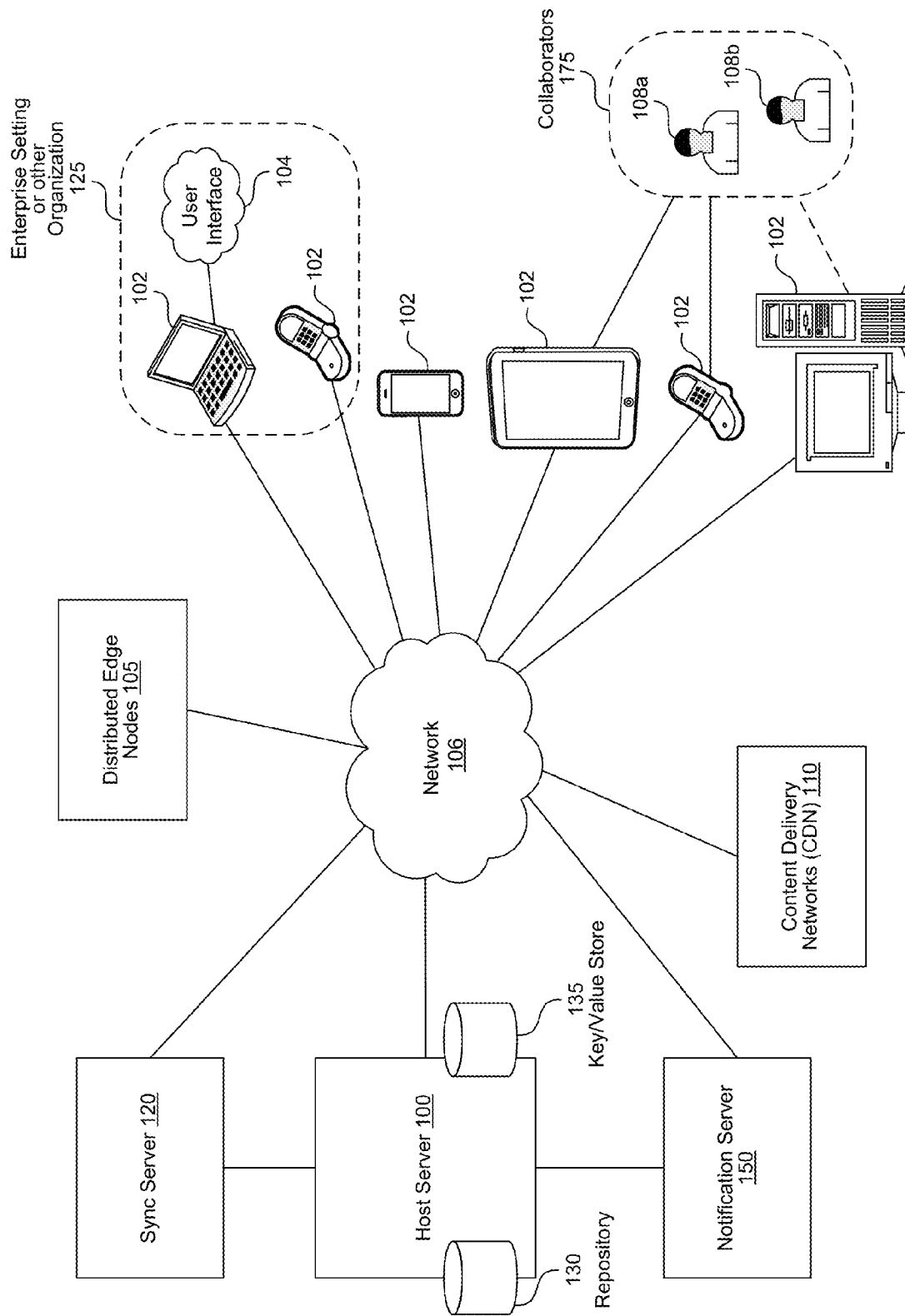
FIG. 1 illustrates an example diagram of a system having a host server capable of using feedback information to optimize or enhance upload (or download) performance.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

As used herein, a "module," a "manager," a "tracker," an "extractor," an "interface," a "processor," an "updator," an "optimizer," a "selector," an "engine," a "logger," a "creator," a "calculator," a "reporter," a "detector," a "receiver," or an "invalidator" includes a general purpose, dedicated or shared processor and, typically, firmware or software modules that are executed by the processor. Depending upon implementation-specific or other considerations, the module, manager, tracker, extractor, interface, processor, updator, optimizer, selector, engine, logger, creator, calculator, reporter, detector, receiver or invalidator can be centralized or its functionality distributed. The module, manager, tracker, extractor, interface, processor, updator, optimizer, selector, engine, logger, creator, calculator, reporter, detector, receiver or invalidator can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Users use collaboration or cloud storage platforms to share files of all sizes around the world. However, upload/download speeds tend to decrease as users get farther away from the location of data centers for the collaboration or cloud storage platforms. Even with third-party content delivery networks (e.g., Akamai) to accelerate uploads/downloads, some users cannot achieve speeds anywhere near what their Internet connection is able to support. Furthermore, sometimes direct upload can be much faster than an upload through an accelerator such as those provided by content delivery networks. The disclosed technology solves these problems by using network optimization and routing strategies to enhance data transfer performance and improve user experience.

Embodiments of the present disclosure include systems and methods for enhancing or optimizing upload and/or download performance using feedback information. The feedback information is collected by a client-side and/or server-side feedback loop that can be used to appropriately gauge the speed for individual locations, browsers and/or operating systems and select an upload/download pathway to obtain real time or near real time enhancement and optimization of upload/download performance (e.g., speed, reliability) and improvement in user experience. Further optimization for uploading/downloading larger files can also be implemented.

FIG. 1A illustrates an example diagram of a system having a host server capable of using feedback information to optimize or enhance upload (and/or download) performance between a client device 102 and a host server 100.

The client devices 102 can be any system and/or device, and/or any combination of devices/systems that is able to establish a connection, including wired, wireless, cellular connections with another device, a server and/or other systems such as the host server 100, a sync server 120 and/or notification server 150 directly or via hosts or pathways such as one or more distributed edge nodes 105 and/or content delivery networks (CDNs) 110. The client devices 102 will typically include a display and/or other output functionalities to present information and data exchanged between among the client devices 102 and/or the host server 100, the sync server 120 and/or the notification server 150, and optionally the distributed edge nodes 105 and the third-party content delivery networks 110.

For example, the client devices 102 can include mobile, hand-held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held device, etc., running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform). In one embodiment, the client devices 102, the host server 100, the notification server 150, the distributed edge nodes 105, and/or the content delivery networks 110 are coupled via a network 106. In some embodiments, the client devices 102 and the host server 100 may be directly connected to one another.

The input mechanism on the client devices 102 can include a touch screen keypad (including single touch, multi-touch, gesture sensing in 2D or 3D, etc.), a physical keypad, a mouse, a pointer, a track pad, a motion detector (e.g., including 1-axis, 2-axis, 3-axis accelerometer), a light sensor, a capacitance sensor, a resistance sensor, a temperature sensor, a proximity sensor, a piezoelectric device, a device-orientation detector (e.g., electronic compass, tilt sensor, rotation sensor, gyroscope, accelerometer), or a combination of the above.

Signals received or detected indicating user activity at the client devices 102 through one or more of the above input mechanisms, or others, can be used in the disclosed technology by various users or collaborators 175 (e.g., collaborators 108a, 108b) for accessing, through network 106, a web-based collaboration environment or online collaboration platform or a cloud-based storage platform (e.g., hosted by the host server 100).

The online collaboration platform or a cloud-based storage platform is utilized by users to share files of all sizes with others around the world. Users can upload/download files from physical datacenters. Depending on the location, a user may be located closer or farther away from a physical datacenter where files are stored. Since upload/download speeds tend to decrease as users become farther away from physical datacenters, hosts or intermediary nodes (e.g., file uploader/downloader) can be utilized to accelerate uploads/downloads.

The cloud-based storage platform can store work items uploaded by users, and can allow download of work items by users. The collaboration platform or environment hosts workspaces with work items that one or more users can access (e.g., view, edit, update, revise, comment, download, preview, tag, or otherwise manipulate). A work item can generally include any type of digital or electronic content that can be viewed or accessed via an electronic device (e.g., client device 102). The digital content can include .pdf files, .doc, slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or an administrative user, for example.

In general, a workspace can be associated with a set of users or collaborators (e.g., collaborators 175) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see edits, revisions, comments, or annotations being made remotely to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
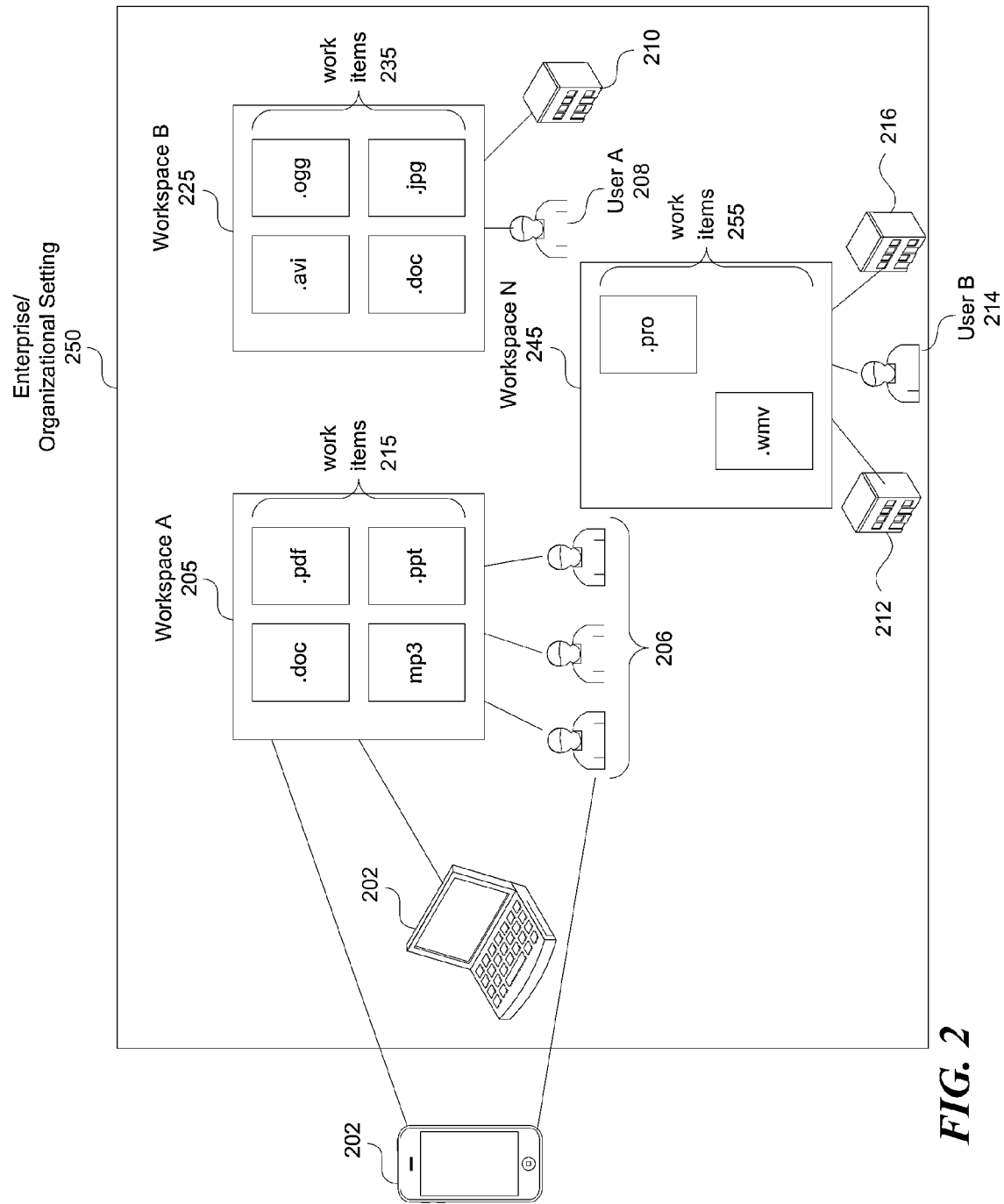
FIG. 2 depicts an example diagram of a web-based or online collaboration platform deployed in an enterprise or other organizational setting for organizing work items and workspaces, accessible using a mobile site or using a mobile platform.

A diagrammatic illustration of the online collaboration environment and the relationships between workspaces and users/collaborators are illustrated with further reference to the example of FIG. 2.

In one embodiment, the host server 100 of the online or web-based collaboration environment provides platform and application independent methods and features for networked file access and editing by a remote device (e.g., by user devices 102). Specifically, the host server 100 and components residing on a client side (e.g., on a user device 102) enables a user to edit files or other work items on the host server 100 using their own choice of applications, or any application that is available on the device 102 they are using to access/edit the file, and regardless of the device 102 platform (e.g., mobile, or desktop or operating system).

Furthermore, the user can edit the file accessed from the host server 100 without the additional process of manually downloading and storing the file locally on the user device 102. For example, the file may be ready for the user to edit locally without informing that the file is stored or prompting the user for a directory in which to store the file, to streamline the access/edit process to enhance user experience.

Functions and techniques performed by the host server 100, the client side components on a user device 102, a sync client on a user device 102, a sync server 120 and other related components therein are described, respectively, in detail with further reference to the examples of FIGS. 5A-7B.

In one embodiment, the client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, and 255 and workspaces 205, 225, and 245, accessible using a mobile site or using a mobile platform.

The web-based platform for collaborating on projects or jointly working on documents can be used by individual users and shared among collaborators. In addition, the collaboration platform can be deployed in an organized setting including, but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N 245 can be associated with work items 255. The work items 215, 235, and 255 may be unique to each work space but need not be. For example, a particular word document can be associated with only one work space (e.g., work space A 205) or it may be associated with multiple work spaces (e.g., work space A 205 and work space B 225).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set a permission setting applicable to all work items 235 for other associated users and/or users associated with the affiliate department 210. Creator user A 208 may also set different permission settings for each work item, which may be the same for different users, or varying for different users.

In each work space A, B . . . N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can cause notifications to be generated. Such notifications can be sent to relevant users to notify them of actions surrounding a download, an edit, a change, a modification, a new file, a conflicting version, or an upload of an edited or modified file.

A workspace in an online or web-based collaboration environment is accessible by multiple collaborators through various devices, including via a mobile site or mobile platform associated with the collaboration environment.

Each user can individually use multiple different devices to access and/or manipulate work items in a work space with which they are associated with. For example, users can be collaborators on a project to which certain work items are relevant. Since the work items are hosted by the collaboration environment (e.g., a cloud-based environment), each user can access the work items anytime, and from any physical location using any device (e.g., including devices they own or any shared/public/loaner device).

Work items to be edited or viewed can be accessed from the workspace in accordance with the platform and/or application independent mechanisms disclosed herein. Users can also be notified of access-, edit-, modification-, and/or upload-related actions performed on work items by other users or any other types of activities detected in the work space. For example, if a user modifies a document, associated collaborators can be notified of the modification in real time, or near real time, or not in real time. The notifications can be sent through any of all of the devices associated with a given user, in various formats including, one or more of, email, SMS, or via a pop-up window in a user interface which the user uses to access the collaboration platform. In the event of multiple notifications, each notification can be depicted preferentially (e.g., ordering in the user interface) based on user preferences and/or relevance to the user (e.g., implicit or explicit).

For example, a notification of download-, access-, read-, write-, edit-, or upload-related activities can be presented in a feed stream among other notifications through a user interface on the user device according to relevancy to the user determined based on current or recent activity of the user in the web-based collaboration environment.

Figure 3:
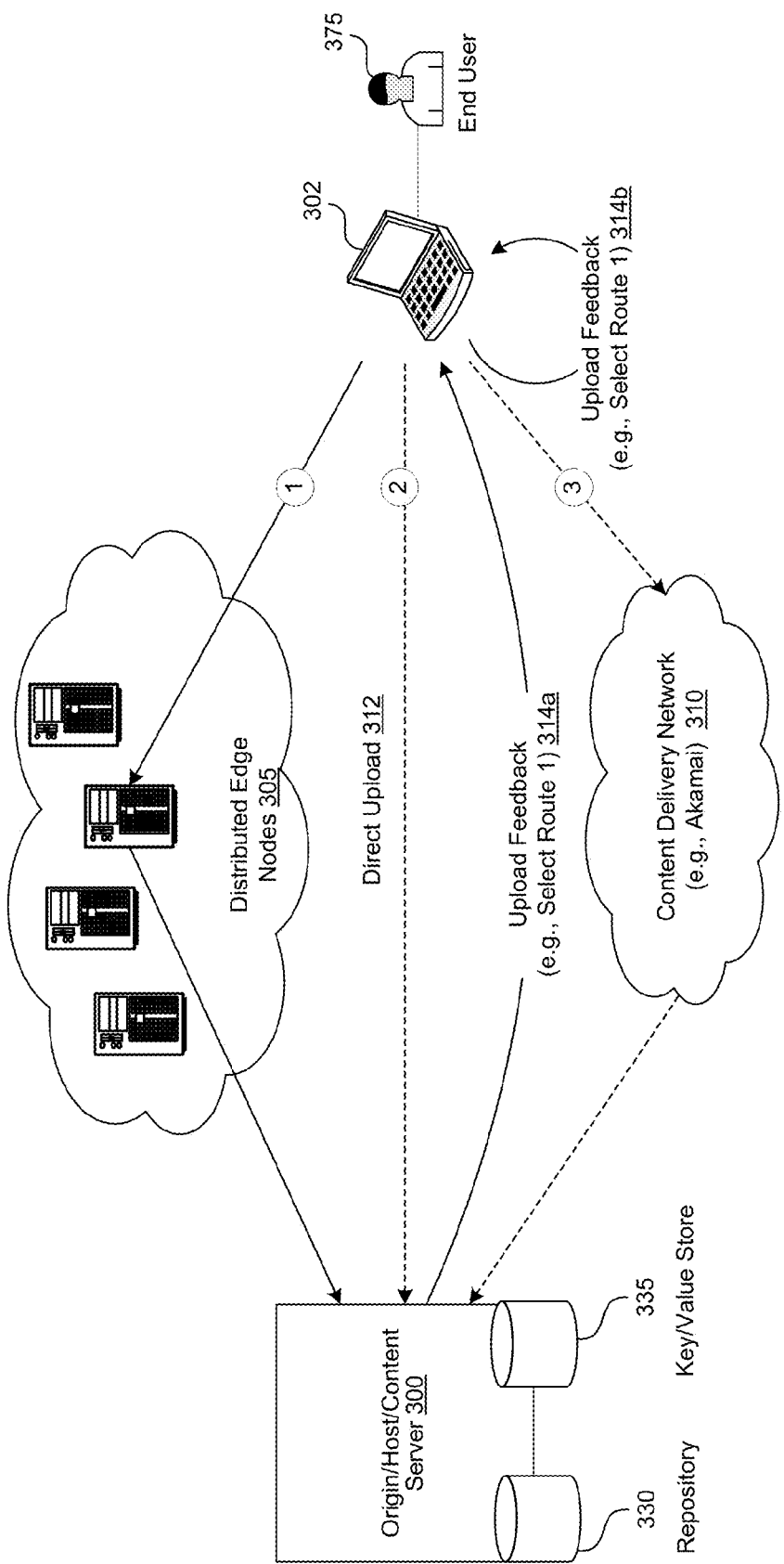
FIG. 3 illustrates an example diagram of a system having a host server, origin server or content server capable of using feedback information to select an upload (or download) pathway from a number of alternative pathways to optimize or enhance upload (or download) performance.

FIG. 3 illustrates an example diagram of a system having a host server, origin server or content server 300 (e.g., the host server 100 in FIG. 1) capable of using feedback information to select an upload (or download) route or pathway from a number of alternative pathways for a client or user device 302 (e.g., client device 102 in FIG. 1) to optimize or enhance upload (or download) performance between the user device 302 and the host server 300.

Time to upload/download a file to/from a remote host (e.g., host server 300) depends on various factors. Usually, the time is limited by a user's upload bandwidth. For example, if the user 375 pays for Internet service that advertises 2 MB/s upload speed, then the user might expect a 20 MB file to upload in 10 seconds. However, the user can usually only approach that speed if he or she is connected to a remote host that is nearby, since factors such as network congestion, the "TCP window," and latency to the remote host usually reduces the upload speed performance. To approach the user's theoretical maximum upload speed, the connection between a client device (e.g., client device 302) and the remote host (e.g., the host server 300) usually needs to have low latency. Latency is the time it takes for packets to make a "round trip" between the client device (e.g., client device 302) and the remote host (e.g., the host server 300).

Users who are further away from the remote host upload slower because of the way TCP (Transport Control Protocol) attempts to guess the bandwidth of a connection. When the user starts to send data, the TCP stack on the client device sends a few packets at first, followed by more packets as it hears back from the remote host that data is arriving successfully. The success messages from the remote host are called "acknowledgements" or "ACKs." TCP does not speed up at all until it receives ACKs. As a result, when it takes a long time to get the ACKs, TCP spends a longer time making the client device wait, rather than sending data. Thus TCP, inherently, underutilizes one's Internet connection early in the connection. Furthermore, TCP backs off fast when it detects congestion, and then speeds up slowly again limited by the round trip time or latency. As packets traverse more systems, TCP is likely to have to retransmit the packets (because of packets being lost or dropped), which can also slow down the connection.

The disclosed technology, in an embodiment, distributes edge nodes or edge servers to regions around the world to reduce the latency in round trips that the TCP protocol causes users to experience when they are uploading or downloading files from remote hosts such as the host server 300. The distributed edge nodes can utilize two individual connections. The distributed edge node can be close to the end user such that the latency of the connection is small. After the low latency connection between the end user and the edge node terminates, a second connection between the edge node and the backend can be created. This significantly reduces the latency since the client device spends less time waiting on the TCP window being saturated. In other embodiments, the disclosed technology includes virtual machines on Amazon EC2, Microsoft Azure and other cloud infrastructures that can effectively act as another option for accelerating uploads and/or downloads.

As illustrated in FIG. 3, a request from the client device 302 associated with the user 375 to upload (or download) files can be routed to an edge node 305 that is in geographic proximity to the client device 302 to obtain latency reduction and improvement in the user experience. Data uploaded to the distributed edge nodes 305 still have to be sent to the host server 300. However, the connection from the edge nodes 305 to the host server 300 can be a good connection, or at least can be a connection that is free from bandwidth throttling or other limitations.

As depicted in FIG. 3, in addition to the direct upload route 312 whereby the user 375 can upload files directly to the host server 300 and upload via the distributed edge nodes 305, the disclosed technology, in an embodiment, provides the user 375 an additional route 310 to upload/download files to/from the host server 300. The additional route 310 can be one or more content delivery networks (CDNs) such as the CDNs provided by commercial CDNs (e.g., Akamai Technologies, Limelight Networks), Telco CDNs (e.g., AT&T Inc., Verizon), and the like. Thus, the user 375 can upload files to the host server 300 directly or via an edge node 305 near the user or a third-party content delivery network 310. In an embodiment, the client device 302 and/or the host server 300 can make a determination regarding the optimal path available and then utilize the optimal path to upload or download files to or from the host server 300. The optimal path can be a path that optimizes certain attributes associated with upload/download for a given set of client device characteristics. For example, the optimal path can include the fastest path when speed is the factor being optimized. Similarly, the optimal path can include the most reliable path when reliability is the factor being optimized. In some embodiments, more than one factor can be optimized to determine the optimal path.

In an embodiment, the client device 302 can determine the optimal path (e.g., the fastest path from the options available (e.g., path 305, 312 and 310) independent of the host server 300 based on upload feedback 314b. For example, the client device 302 can perform an upload speed test (e.g., via an upload UI or in the background) to each of the servers 305, 310 and 300. The client device 302 can then compare the results of the upload speed test to determine and select the fastest upload path. The client device, in an embodiment, further caches the results so that the upload speed test need not be repeated before each upload. However, since a path that is determined to be fast at a given time can change and not remain fast at a later time, the cache can be managed or invalidated periodically so that the selection of the upload path is based on results that are valid. This client-side feedback loop allows optimization or enhancement of the upload/download performance.

Selection of the optimal (e.g., fastest) path can be based on upload feedback 314a from the host server 300. The determination of the fastest path does not interfere with the user experience and adapts to dynamic conditions of the connection (e.g., Internet), but still allows uploads to flow through the fastest path from the options available. The host server 300 can dynamically route uploaded files along the fastest paths, taking advantage of the edge nodes 305, CDNs 310 and the upload route 312 direct to the host server 300, collect upload speed data from every upload location, and use that data to suggest a path for future uploads. Thus, the server-side feedback loop allows optimization or enhancement of the upload/download performance.

Figure 4:
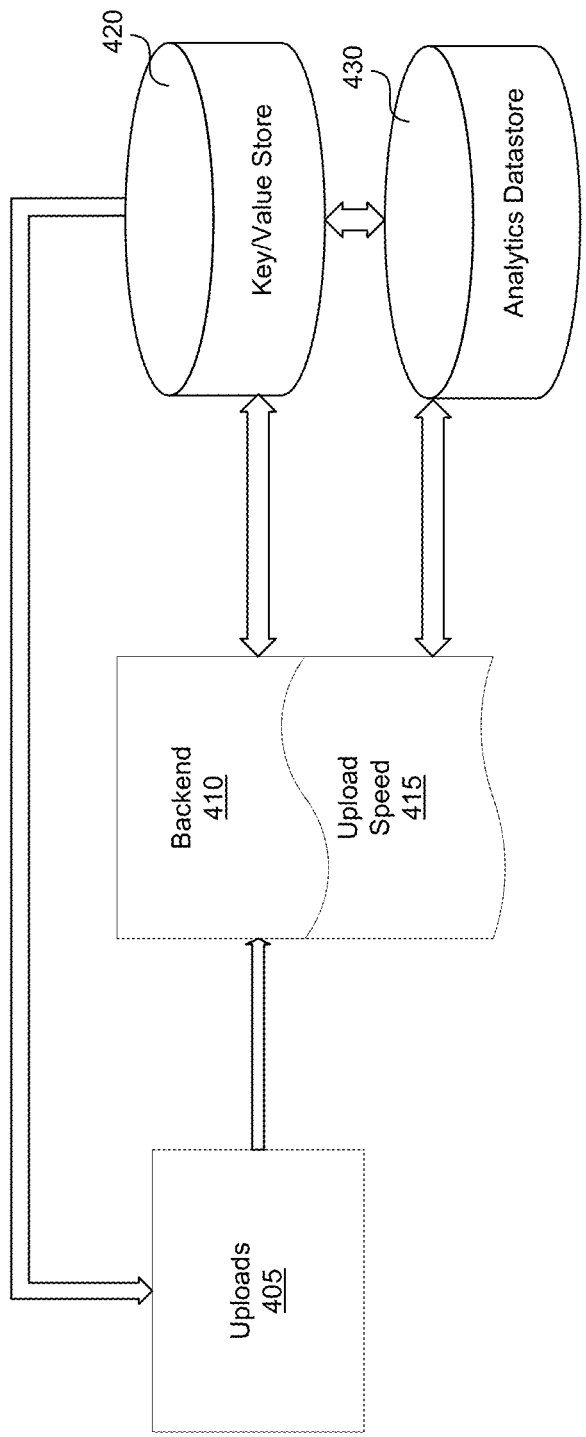
FIG. 4 illustrates an example diagram of a feedback loop for optimizing or enhancing upload (or download) performance.

FIG. 4 illustrates an example diagram of a feedback loop for optimizing or enhancing upload (or download) performance.

In an embodiment, the feedback loop is a mechanism that collects upload/download speed data from every upload/download location or server (e.g., the edge servers, the CDNs, the host server such as the cloud-based collaboration platform server 100 in FIG. 1) and uses the collected data to suggest a pathway for future uploads/downloads. As described with reference to FIG. 3, the feedback loop can be a client-side feedback loop or a server-side feedback loop. The client-side feedback loop and the server-side feedback loop can each be implemented on its own or in conjunction with each other in various embodiments of the disclosed technology.

The feedback loop recognizes that data transfer speeds can be highly variable and sensitive to the environment and the context. Factors such as the Internet Service Provider (ISP) that a user device is connected to, the operating system of the user device and the exact browser (for browser-based uploads) can influence the speed of the upload/download. Such internal factors, routes, latency and packet loss characteristics between the user device and the upload server can affect the upload speed, making the task of predicting which route might be the fastest difficult.

The feedback loop clocks the speed of real uploads through every pathway, aggregates the upload information based on a combination of factors and when a user is about to upload, based on a given combination of factors, it chooses a pathway with a probability such that the faster pathways are reused much more often, and the slow ones are retried just frequently enough to not penalize them. This method allows for selection of a faster pathway much more often than a slower path. In other words, the bulk of the traffic is sent through faster pathways but the slower pathways can be retried occasionally to validate that their performance has not changed. This retry mechanism allows the system to reassess the pathways and avoid making a poor choice if other pathways improve. The same is true if the speed recorded for a slow pathway was anomalous.

As illustrated in FIG. 4, in an embodiment, uploads 405 from client devices (e.g., client device 302 in FIG. 3) via various pathways are received at the backend 410 (e.g., the host server 300 in FIG. 3). As an upload is received at the backend 410, the timestamps when the first and last bytes of the upload reach the server-side are recorded. The host server then uses the timestamp information to compute or estimate the upload speed 415 at which the upload occurred. The upload speed 415 and other signals, indications, attributes or characteristics about the user, the upload and/or the client device from where the upload originated are recorded in an analytics datastore 430. The logged information is used to perform analysis after the fact about signals that can be used in the future to make decisions in real time.

The feedback loop includes an aggregator that aggregates upload speeds for each pathway using a combination of factors (or a set of characteristics or attributes). The aggregate upload speeds are stored in a key/value store 420, where the combination of factors is the key or identifier to a record that holds as value an array of pathways or hosts and upload speeds associated with the pathways. The key/value store 420 provides fast access to recent information about the speed of uploads via each pathway. Further, since the upload speeds are aggregated using a combination of factors, users that are likely to perform similarly are grouped together. This allows one user's experience about an upload to influence the upload choices of other users in the same grouping. For example, when two users at the same location, who have the same operating system and browser combination, are uploading files to the same host server (e.g., using the same Wi-Fi connection), their uploads will influence the aggregator. This means that when the next user having the same location, browser and operating system characteristics is about to upload a file, the information from the two users can be used to determine where the next user should upload to. While doing so, the feedback loop remains entirely decoupled from individual users. For example, when a user uploads from his or her home connection, the user is using a different set of aggregates compared to when the user is uploading from their work connection, and upload data from the "home" connection is aggregated in a bucket separate from the "work" connection.

Tables 1 and 2 below provide examples of two aggregators. Table 1 shows a first aggregator after 21 files have been uploaded from a location in Virginia using client devices having a specific combination of browser and operating system platform. As depicted in Table 1, after an initial observation period during which pathways were tried using round robin selection, most of the uploads were through the "DC Edge Node" which has significantly higher upload speed than the CDN or the direct to host server.

TABLE 1

Aggregator with optimization using real-time feedback loop

| Upload Route | Aggregate Upload Speed | Upload Count |
| --- | --- | --- |
| DC Edge Node | 25,816 kbps (3,227 KB/s) | 16 |
| CDN | 9,839 kbps (1,230 KB/s) | 3 |
| Direct to Host Server | 1,222 kbps (153 KB/s) | 2 |

Table 2 below shows a second aggregator after 5 files have been uploaded from a location in Connecticut using a client device. As depicted in Table 2, the upload speeds across each of the pathways are comparable, indicating that the Internet connection was throttled, and thus there is no optimization to be provided. The upload count indicates that upload route is selected using round robin.

TABLE 2

Aggregator without Optimization

| Upload Route | Aggregate Upload Speed | Upload Count |
| --- | --- | --- |
| CDN | 2,082 kbps (260 KB/s) | 1 |
| Direct to Host Server | 2,070 kbps (259 KB/s) | 2 |
| DC Edge Node | 2,049 kbps (256 KB/s) | 2 |

The key/value store 420 can be implemented as a non-persistent datastore such as memcache or other caching system. The key/value store 420 can store, as an array, information such as an aggregate upload/download speed for each pathway and a frequency with which each pathway was used for upload/download in association with a key that can comprise a set of client device/user characteristics such as an IP address (e.g., first three or any number of octets), an operating system version, a browser version, a time period, and/or a combination of any of the above. For example, all upload data for a given day from client devices having IP addresses 24.24.24.XX, Windows 7 and Internet Explorer v. 8.0 are aggregated and stored under the key (24.24.24.XX, Windows 7, Internet Explorer v. 8.0). The value stored under each key is updated as new upload/download data becomes available.

In a web application, for example, a web client (or mobile client) can send a request to get an upload host suggestion from the feedback loop at upload time. When the upload request is detected, the feedback loop accesses the key/value store 420 to review key/values for a given time period (e.g., 7 days), and selects a pathway that has the maximum or higher normalized sum of speeds over the given time period.

The key/value store 420 can be configured to have a certain size, depending on the size of each entry in the key/value store, the number of possible keys, number of operating system versions, number of browser versions and number of days' worth of data. For example, if each entry in the key/value store 420 is estimated to have a size of 250 bytes, the number of keys possible is $2^{24}$ (i.e., first three octets of the IP address), and if 3 OS versions and 6 browser versions are being recorded for 7 days, the theoretical maximum size of the key/value store 420 can be determined to be:

$$2^{24} \times 3 \times 6 \times 250 B \times 7 \approx 492 \text{ GB}$$

In addition to recent data being stored in the memcache key/value store 420, the system also includes the persistent analytics cluster or datastore 430 that stores all analytics data. In one embodiment, data stored in the analytics cluster 430 can include, but is not limited to: IP address (e.g., unsigned int), upload/download session id (or connection diagnostics ID), user ID, enterprise ID, upload/download size (bytes), upload/download duration (milliseconds), upload/download speed (e.g., in kbps), upload/download start timestamp (epoch seconds), upload/download proxy (maps to class constants), platform and/or major version, browser and/or major version, upload/download type (e.g., HTML5, AJAX, connection diagnostic test, class constants), country, region, and/or the like. When the information in the key/value store 420 expires, or when a total memcached flush occurs (unintentional or otherwise), the data stored in the analytics cluster 430 can be used to repopulate the entries in the key/value store 420.

Figure 5A:
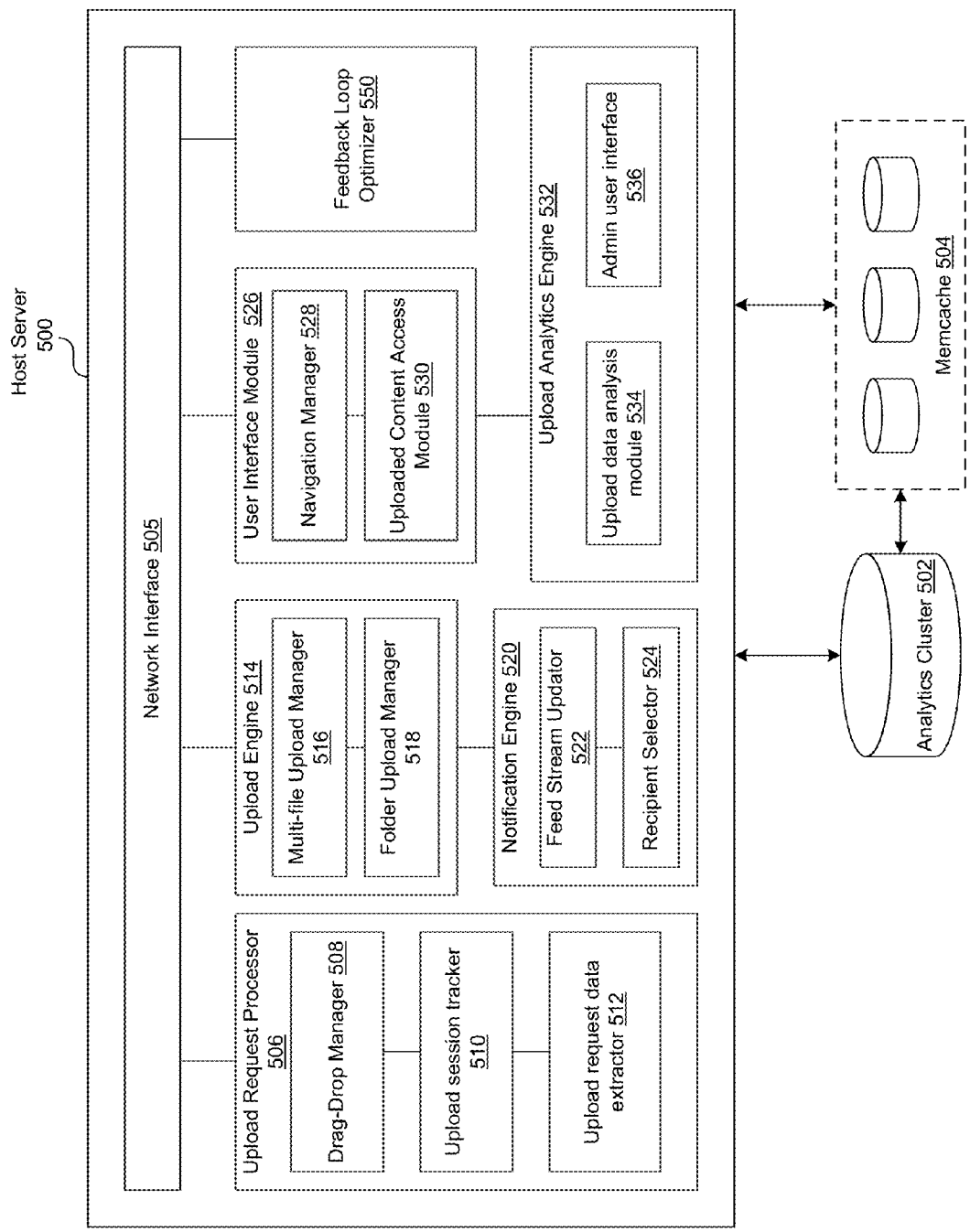
FIG. 5A illustrates a block diagram depicting example components of a host server capable of using feedback information to select a pathway from a number of alternative pathways for a client device to upload (or download) data to optimize or enhance upload (or download) performance.

FIG. 5A illustrates a block diagram depicting example components of a host server 500 capable of using feedback information to select a pathway from a number of alternative pathways for a client device to upload (or download) data to optimize or enhance upload (or download) performance.

In an embodiment, the host server 500 of the web-based or online collaboration environment can generally be a cloud-based service (e.g., the host server 100 in FIG. 1). In an alternate embodiment, the host server 500 can be any host server or content server from where data can be downloaded or to where data can be uploaded. The host server 500 can include, for example, a network interface 505, an upload request processor 506 having a drag-drop manager 508, an upload session tracker 510 and an upload request data extractor 512, an upload engine 514 having a multi-file upload manager 516 and a folder upload manager 518, a notification engine 520 having a feed stream updator 522 and a recipient selector 524, a user interface module 526 having a navigation manager 528 and an uploaded content access module 530, a feedback loop optimizer 550, and an upload analytics engine 532 having an upload data analysis module 534 and an admin user interface 536. One or more components of the host server 100 can be in communication with or coupled to a persistent analytics cluster or datastore 502, and one or more memcached key/value store 504.

The network interface 505 can be a networking module that enables the host server 500 to mediate data in a network with an entity that is external to the host server 500, through any known and/or convenient communications protocol supported by the host and the external entity. The network interface 505 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE), Bluetooth, a router, an access point, a wireless router, a switch, a multilayer switch, a protocol converter, a gateway, a bridge, a bridge router, a hub, a digital media receiver, and/or a repeater. The external entity can be any device capable of communicating with the host server 500, and can include client devices 102, sync server 120, notification server 150, distributed edge nodes 105, content delivery networks 110, and the like illustrated in FIG. 1.

An embodiment of the host server 500 includes the upload request processor 506 which can receive, detect, process, identify, parse, extract, translate, and/or determine an upload start request or notification and/or an actual upload from a client device. The upload request can be submitted by a user (e.g., through a user interface of a web-based or mobile application) to upload one or multiple items. The upload start request (or initial request for upload pathway) can be a run-mode request that reaches the host server prior to the actual upload. The upload start request can inform the host server of the upload and provide information such as the IP address, browser version, platform version of the client device, or the like. The upload start request can allow the host server to keep track of failures or other problems with the upload. The upload start request can also act as a request to the host server to provide an optimal upload pathway for the client device to upload files. The host server can determine the optimal upload pathway via the feedback loop optimizer 550 and provide the optimal upload pathway to the client device. The feedback loop optimizer 550 is described in detail in FIG. 5B. The client device can then upload the selected file or files to the optimal upload pathway. In some embodiments, instead of an optimal upload pathway, the host server can provide the client device a weighting or other information using which the client device can itself select an optimal upload pathway using an algorithm (e.g., random weighted selection method).

When the upload start request is detected by the upload request processor 506 (e.g., using a Perl script), information such as the IP address, browser and platform information (e.g., name, version), and the like in the upload start request (e.g., HTTP or HTTPS request) can be parsed and extracted by the upload start request data extractor 512, and a new entry for the upload can be created in the analytics cluster 502 and/or the memcached servers 504 to store the upload data. In an embodiment, a session ID can be created by the upload session tracker 510. The session ID can be provided to the client device and may be stored along with the IP address in the analytics cluster 502 and/or the memcached servers 504. The session ID allows the host server 500 to associate an upload to the corresponding IP address. This can be advantageous in cases where an upload pathway via which the upload is routed wipes out the IP address of the client device. When a session ID is included in the upload, even if the IP address is wiped out, the host server 500 can use the session ID to determine the IP address associated with the upload.

The user can identify the files, content, or items to be uploaded to the host server 500 one-by-one and queue up multiple items (e.g., including but not limited to files, folders, documents, images, audio) to be uploaded in a single request. The user can also select all of the items to be uploaded in a single action (e.g., via highlighting or otherwise selecting icons corresponding to each of the items). In one embodiment, the upload request is generated via a drag-and-drop action of the multiple work items to be uploaded to the host server into a portion of the user interface. Drag-and-drop activated uploaded requests can be detected, handled, received, processed, and/or otherwise managed by the drag-drop manager 508.

In an embodiment, the upload request is generated via a drag-and-drop action of a single folder which includes the multiple work items to be uploaded to the host server 500. For example, the upload request can be generated when a folder having the multiple items on a client device that is to be uploaded is identified through the user interface. In some instances, the folder can include additional folders in a folder hierarchy of multiple items. In some instances, the user can generate an upload request by activating the upload feature in a tab on the user interface and initiate uploading by selecting (e.g., clicking on or otherwise activating) the button/tab. Once selected, another user interface or a pop-up window may appear allowing the user to navigate through files or folders to select the items to be uploaded.

Once upload requests have been detected and processed, the upload engine 514 can upload the requested item or multiple requested items. The upload engine 514, in an embodiment, uploads a single item or multiple items (e.g., sequentially or simultaneously) to the host server 500 via the server-selected (or client-selected) upload pathway. A multiple item upload may be initiated via a single-step or multi-step user request. A multi-file upload request can be handled, processed, and executed, for example, through the multi-file upload manager 516.

In one embodiment, the multi-file upload manager 516 receives an identification of each of the multiple files to be uploaded (e.g., from the upload request processor 506) and sequentially prepares each individual file for uploading and uploads each file independently. For example, the multi-file upload manager 516 can compress one of the multiple files individually, upload it to the host server 500 and decompress the file when uploaded and proceed to perform the same steps with the next file. Preprocessing a file can include, for example, analyzing the file size and type to determine if it is acceptable/valid and/or to identify how best to compress the file. Post-processing can include, for example, performing one or more of, decompressing the file, validating the file size and name, checking permissions, potentially scanning for malicious software, and/or moving to permanent storage. The step of moving to storage can further include, one or more of, adding the file metadata to the database, creating thumbnails, creating previews, indexing for search, encrypting the file, and/or storing in multiple locations for redundancy. Note that the above processes can occur in any order or synchronously in any combination with one another. The process continues until all items in the request have been uploaded to the host server 500. The upload may automatically progress from one file when completed to the next one in sequence when the user initiates a multi-file upload request.

In one embodiment, the upload engine 514 uploads multiple items in a folder hierarchy based on a single request to upload a folder which has a hierarchy of folders inside, for example, via the folder upload manager 518. In one embodiment, the folder upload manager compresses the multiple items in the folder hierarchy in a single process into a single item and uploads the single item in a single upload process (rather than one by one) to the host server 500. After the merged file of multiple items has been uploaded, the folder upload manager 518 can decompress and subsequently parse the single upload of the single item into the original individual files that were stored as multiple items in the folders in the hierarchy. By merging multiple files into one and performing a single compression, and decompression step, the uploading process can be expedited since the overhead in time to compress and decompress multiple files is mostly eliminated. Some additional benefits of bulk uploading allow the following overhead to be partially or wholly eliminated: repeatedly creating TCP connections for each upload, repeatedly checking the same permissions and storage quotas when processing the files on the server.

One embodiment of the host server 500 includes the user experience/user interface module 526, which preserves or enhances user experience before, during, or after an upload request. For example, the user experience/user interface module 526 (UE/UI module) can allow the user to engage in other activities in the collaboration platform while an upload is in progress so as to prevent the user from having to wait for the completion to work in the platform.

In one embodiment, during the upload of a single file (before completion), the user can generally navigate away from the user interface through which the upload request was submitted, for example, via the navigation manager 528 in the user experience/user interface module 526. In other words, while a file or item upload is in progress, the user can navigate to other pages to perform other actions or initiate additional actions on the current page without interrupting (stopping or pausing) the in-progress upload.

Similarly, when a multi-file or multi-item upload request is in progress, the user can also navigate away from the user interface which the upload request was submitted prior to completion of the uploading of each of the multiple items to the host server 500 via an accelerator node. Navigation between pages during an upload of multiple files can also be managed by the navigation manager 528. For example, the upload of the multiple items can continue to proceed and is not interrupted if the user accesses a link on the user interface causing another user interface to launch in a browser. To enable bulk uploading, a new browser window is opened so it operates independently of user navigation. In addition, the web application for uploading and access of the collaboration environment is "pageless," meaning it can be updated asynchronously without a browser page refresh. This allows navigation and to start new uploads in other folders, which can be added to the upload queue.

In addition, during a multi-file upload, an item of the multiple items that has been uploaded to the host server 500 available for access through the user interface, even when some of the multiple items have not yet been uploaded to the host server, via the upload content access module 530, for example. Thus, during an active upload, individual files which have completed uploading can be accessed or interacted with by the user in the collaborative environment without having to wait for the full upload to complete.

In some instances, the item which has been uploaded to the host server is manipulable by the user through the user interface, without a need for browser refresh. This enhances the user experience by allowing the user to work on the file or otherwise interact with it once it has been uploaded without waiting for other files to finish uploading. For example, the user can view, edit, preview, or comment on the item that has been uploaded, prior to completion of uploading all of the multiple items in an upload request. In one embodiment, buffer space in memory for storage of the individual work items are created in response to the upload request such that when individual items have been uploaded, they can be moved into the created buffer space, and subsequently permanent storage. When the file is in permanent storage, the user can then access and work on the individual item, while others are still being uploaded. In one embodiment, metadata for the file can be created before it is fully uploaded or processed, allowing faster user interaction. However, to actually interact with the file content (full content search, download or preview) the file generally needs to be processed as usual and be stored in permanent storage.

In one embodiment, a progress bar indicating upload progress of the upload request is depicted in the user interface. The progress bar indicates the progress of the upload of the full request, typically. For example, if the request is a multi-file upload request, the progress bar indicates the progress of uploading all of the files. In addition, the progress bar can further indicate the total size of upload, time elapse, completed upload file size, time remaining, average speed of upload, and/or total files that have completed upload. Upload progress can be determined since at any moment the uploader knows the total bytes that have been transferred, the time elapsed, and total size of the upload. In one embodiment, the time elapsed can be determined to count only the time that files are being transferred, and not the time files are being processed. In one embodiment, the progress bar is depicted even when the user navigates away from the user interface to another user interface during the upload process.

One embodiment of the host server 500 includes a notification engine 520. The notification engine 520, can for example, update a feed stream to include an updated feed indicating that an item or multiple items have been uploaded, for example, via the feed stream updator 522. The users that are notified can be selected, for example, by the recipient selector 524, and can include collaborators or the user, or other users meeting a criterion. In some instances, the feed stream is updated in real time or near real time relative to when the upload of the item completed. For real-time updating, the notification engine 520 can utilize another server, or another engine in the same server which provides push functionality.

The notification engine 520 can generally inform or notify users, which can be collaborators of the user who performed the activity in the work space via one or more of many mechanisms, including but not limited to, email, SMS, voice-message, text-based message, RSS, feed, and the like.

In one embodiment, the notification is depicted through a web-browser used by the other user to access the web-based collaboration environment, for access in real time or near real time to when the activity was performed by the user. When notifying a user in real time through a web-browser, the notification engine 520 can utilize a push-enabled service to ensure real time notification. In one embodiment, the notification is sent by a component or another server which implements push technology. The push-enabled service can be implemented via long poll or HTTP streaming, for example, by a device which may be internal to or external to the host server 500. In addition, the host server 500 could utilize other push servers including third party push servers to implement push technology including but not limited to mobile platform push systems and services (e.g., via smart phones or tablets or other portable devices such as iPhone, Android phones, Blackberry, iPad, Galaxy or other tablets)

The upload analytics engine 532 can parse, process, and/or analyze data relating to uploads/downloads stored in the analytics cluster 502. The upload data analysis module 534 can perform analytics operations, including statistical analysis, on the stored data. For example, the upload data analysis module 534 can analyze upload information to determine the effectiveness of the memcached speed aggregator, determine adjustments that can be made (e.g., change the time over which data is aggregated, determine if any characteristics are more/less relevant, and the like) and make the adjustments. By way of another example, the upload data analysis module 534 can determine percentage of users (e.g., total users, enterprise account users, free account users) that map to edge nodes, CDNs and/or the host server. Similarly, the upload data analysis module 534 can further determine for each region mapped to an edge server, the percentage of users who are benefitting the edge server at any given time, percentage of users who are instead experiencing faster uploads via a CDN server or directly to the host server. These examples are merely illustrative, and additional analyses on the upload/download data may be performed.

Figure 14:
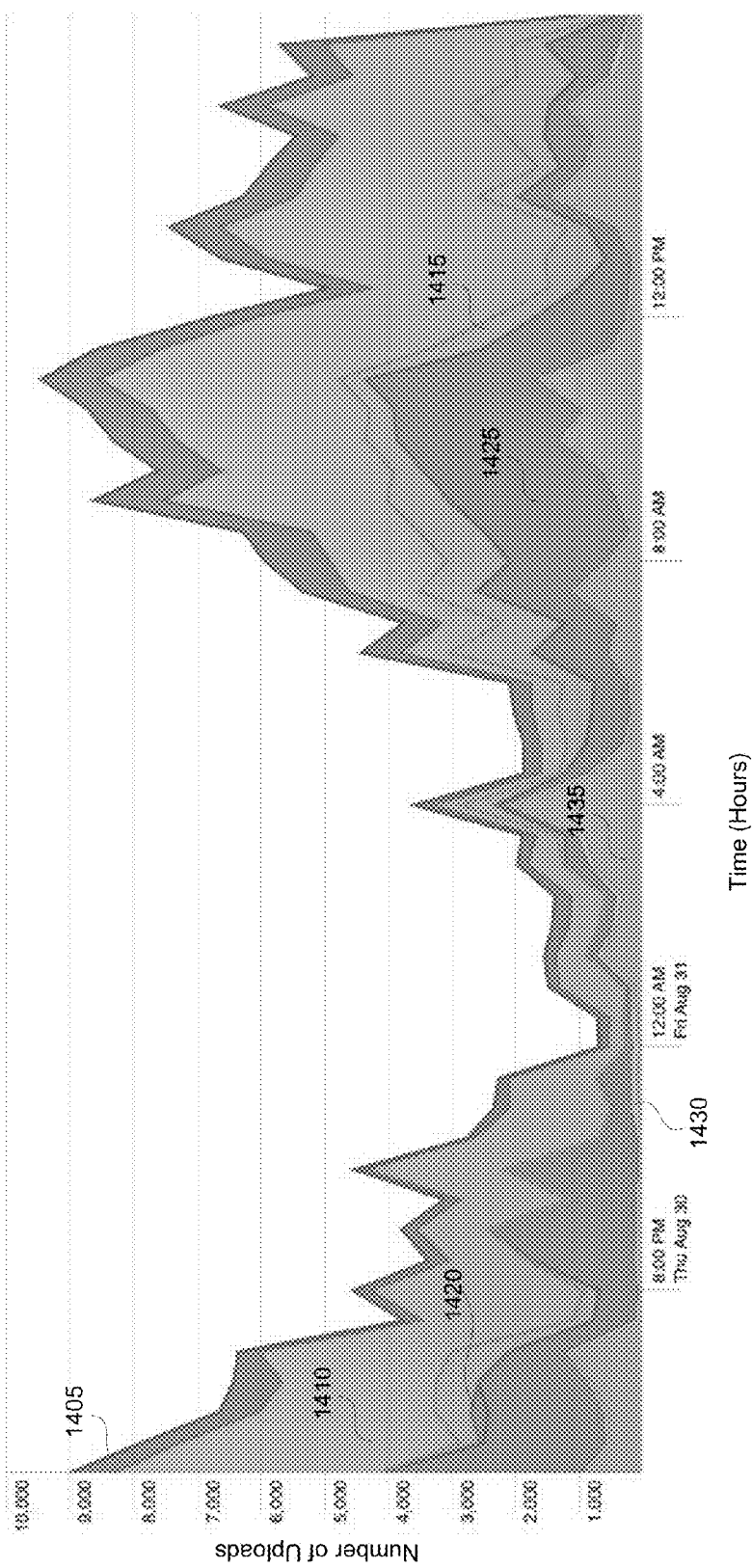
FIG. 14 illustrates a graphical diagram depicting uploads by pathways over time generated using the information tracked or observed at the host server.

FIG. 14 illustrates a graphical diagram depicting uploads by pathways over time generated using the information tracked or observed by the upload analytics engine 532. As depicted, depending on the time, the number of uploads through pathways varies. At 8 pm, a large number of uploads are through CDN servers 1410, while a smaller number of uploads are through other pathways. Just after 8 am, a larger number of uploads are through pathway 1425 (e.g., Washington D.C. edge server). This type of observational data can assist in determining how effective pathways are in accelerating uploads (or downloads) at various times of day.

The administrator user interface 536 allows the admin to specify, adjust, add and/or delete various parameters and settings of the upload pathway feedback loop optimizer. For example, via the admin user interface, types of upload data to be logged can be modified. The admin user interface can also be used to perform the example analyses via the upload data analysis module 534.

Figure 5B:
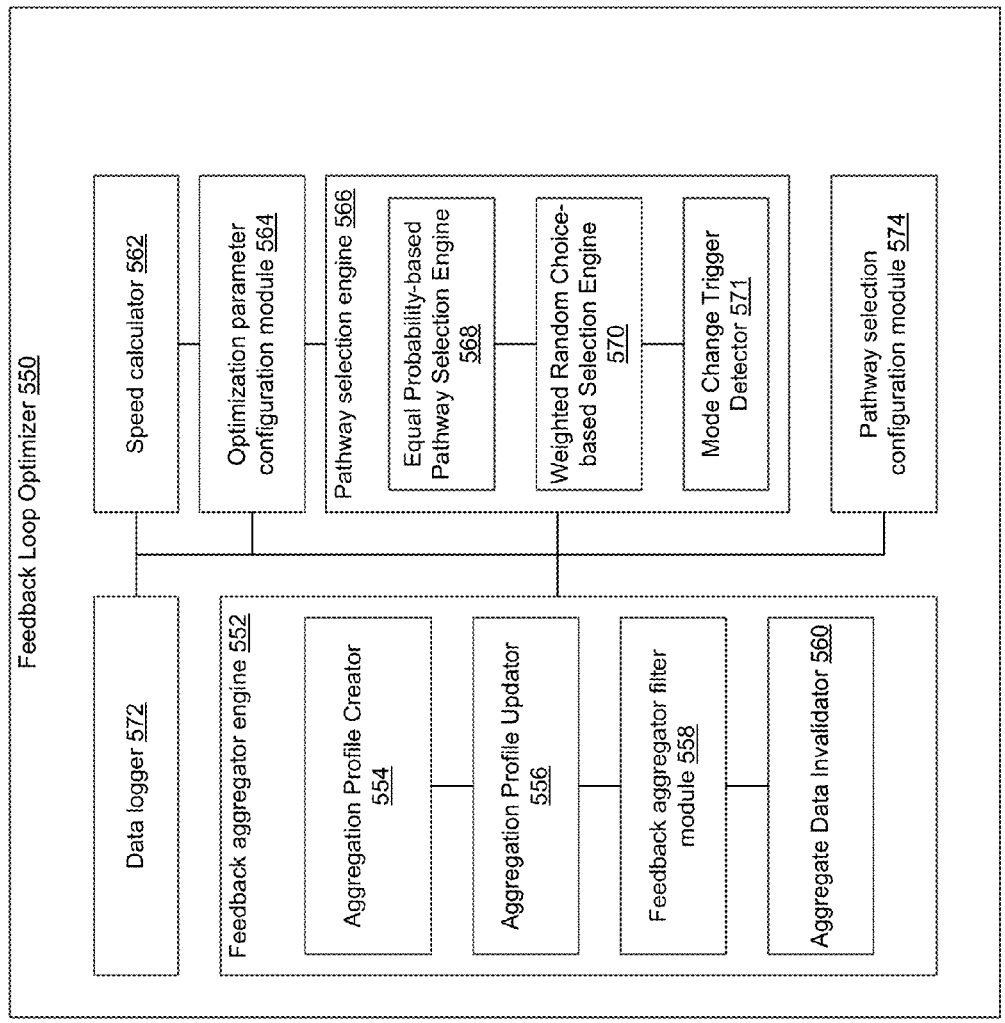
FIG. 5B illustrates a block diagram depicting example components of a feedback loop optimizer of FIG. 5A.

FIG. 5B illustrates a block diagram depicting example components of the feedback loop optimizer 550 of FIG. 5A. The feedback optimizer 550 may include a feedback aggregator engine 552 having an aggregation profile creator 554, an aggregation profile updator 556, a feedback aggregator filter module 558 and/or an aggregate data invalidator module 560. The feedback optimizer 550 may also include a speed calculator 562, an optimization parameter configuration module 564, a pathway selection engine 566 having a probability-based pathway selection engine 568, a weighted random choice based pathway selection engine 570, a mode change trigger module 571, and/or a data logger 572. More or less components may be present in the feedback loop optimizer 550 in some embodiments. One or more of the components of the feedback loop optimizer 550 may be consolidated into a single component, in some embodiments.

The data logger 572 can log data relating to uploads/downloads via each pathway. The data logger 572 can further recognize and extract information relating to uploads/downloads for recording. The upload/download data logged by the data logger 572 can be stored in the analytics cluster 502. The data logger 572 can store various fields of upload/download data such as, but not limited to: the IP address, upload/download session ID, user id (for personal account), enterprise id (for enterprise account), upload/download size, upload/download duration, upload/download speed, upload/download start timestamp, upload/download host or pathway, platform, platform major version, browser, browser major version, upload/download type (e.g., HTML5, AJAX, Connection Diagnostic Test), geographic information (e.g., country, region, zip code), and the like.

In an embodiment, the upload/download speed can be calculated server-side via the speed calculator 562 and stored in the analytics cluster 502. The speed calculator 562 can determine the upload/download speed for each upload/download through each pathway. For example, the speed calculator 562 can use the timestamp for the first byte and the last byte of an upload to determine an upload duration. The speed calculator 562 can then use the upload duration and the upload size to determine the upload speed. In an embodiment, the speed can be calculated on the client-side (e.g., using upload/download speed test). The host server 500 can accept the results of the speed test performed client-side and can insert the result in its datastore (e.g., analytics cluster 502 and/or the memcache 504 along with speed determined server-side. In some instances, the host server can set the upload type for the speed reported by a client device to describe the method that was used to determine the speed (e.g., connection diagnostic test). The feedback loop optimizer 550 can use both types of speed data when selecting a pathway to recommend.

The feedback aggregator engine 552 includes the memcache 504 (or key/value store). The feedback aggregator engine 552 can aggregate and store in the memcache 504, recent and/or relevant data relating to uploads/downloads through various pathways. The feedback aggregator engine 552 can aggregate upload/download data based on a combination of factors such that users or client devices that are likely to perform similarly and/or have similar set of characteristics, features or attributes are grouped together. The data from the feedback aggregator engine 552 can be processed and/or analyzed to determine optimal pathways for a given uploader for uploading/downloading files.

In an embodiment, the feedback aggregator engine 552 can aggregate or group upload/download data associated with uploads/downloads through each pathway into aggregation profiles via the aggregation profile creator 554. Each aggregation profile is defined by a combination of factors such as the IP address (e.g., first 3 octets), OS version, browser version and/or time period. For example, the feedback aggregator engine 552 can aggregate or group together upload data for uploads from the same IP address (e.g., 67.123.129.XX), same browser major version (e.g., Google Chrome Version 27.0) and same OS major version (e.g., Windows 7 Enterprise) through the same upload pathway (e.g., Chicago edge server). A structure of an aggregation profile defined by IP address, OS, browser and time period information that comprises corresponding upload information (e.g., upload speed, upload count) associated with an array of pathways is illustrated below:

```
Key(IP/24, OS, Browser, Day) => array(
    aggregate edge node upload speed,
    number of edge node uploads,
    aggregate CDN upload speed,
    number of CDN uploads,
    aggregate direct upload speed,
    number of direct uploads,
    ...
)
```

In an embodiment, the aggregation profile updator 556 can update or recalculate the aggregate upload/download speed and upload/download count (i.e., number of uploads or downloads) as new uploads/downloads corresponding to an aggregation profile are received. For example, the host server 500 receives an upload via the Portland edge server and having a given combination of IP address, browser and OS (e.g., 123.43.234.XX, Chrome, MacOSx). The speed calculator 562 determines the upload speed to be 8,000 kbps. The aggregation profile updator 556 then looks up the aggregation profile for the given combination of factors and updates the aggregate upload speed and the upload count for the given combination of IP address, browser and OS from a previous value (e.g., aggregate edge node upload speed=5375 kbps and number of edge node uploads=10) to a new or updated value (e.g., aggregate edge node upload speed=5613.64 and number of edge node uploads=11). The new aggregate may be determined using a method substantially similar to the method illustrated below:

```
new_aggregate=[(aggregate_speed*number_of_uploads)+
new_upload_speed]/
(number_of_uploads+1)
new_number_of_uploads=number_of_uploads+1
```

In an embodiment, the feedback aggregator filter module 558 can include one or more filters to ensure that the feedback aggregator engine 552 does not accept upload/download data that are unusable. For example, a file size filter can be implemented when aggregating data that is used for selecting a upload/download pathway. The file size filter can require uploads/downloads to be over a certain size in order to influence the feedback loop. If the uploads/downloads are too small, the TCP window does not have the opportunity to grow sufficiently and the benefits of the edge servers and/or CDN servers cannot be leveraged fully or at all. A threshold for determining which upload/download speeds are outliers can be determined based on empirical or other analysis for example. Another filter that can be used is a filter that puts a limit on the derived upload/download speed. For example, if a file is too small, the file can land in the OS buffers and can cause the host server 500 (or the speed calculator 562) to clock the speed as unreasonably fast (e.g., above a threshold). The derived upload speed filter can filter out or mark the data as being unusable to prevent such data from influencing the feedback loop. In one implementation, an upload speed threshold or size threshold for filtering out outliers can be established and/or periodically adjusted based on analysis of historical upload/download data, determination of the theoretical maximum upload/download speed, and the like, for example.

In an embodiment, the information (e.g., the aggregation profiles) in the memcache 504 that is used to select pathway to upload/download data is marked with an expire time and can become invalid or evicted from the memcache 504 after a certain time, as new information associated with more recent uploads/downloads is added to the memcache 504. The aggregate data invalidator 560 can track a timing attribute (e.g., TTL value) associated with the information in the memcache and can invalidate the information in the memcache 504 that is out of date or expired to avoid such out of date data from being used in the feedback loop. In an embodiment, the aggregate data invalidator 560 maintains x number of days (or any unit of time, such as 24 hours) of data for use in selecting a pathway for upload/download.

In an embodiment, the feedback loop optimizer 550 optimizes upload/download speed in selecting a pathway for upload/download for a given set of characteristics (e.g., IP address, browser information and OS information). The feedback loop optimizer 550 can also optimize other parameters, in addition to or instead of the upload speed in some other embodiments. The optimization parameter configuration module 564 can configure the pathway selection engine 566 to select a pathway based on one or more parameters. For example, the pathway selection engine 566 can be configured via the optimization parameter configuration module 564 to provide an array of pathways and corresponding upload/download speeds (e.g., "Denver Edge node: 7284, CDN: 3905, Direct: 5932"), the best pathway by upload/download speed (e.g., "Denver Edge node"), the best pathway by votes (e.g., "CDN"), and the like in response to a request for an upload/download pathway.

In an embodiment, the pathway selection engine 566 receives specific types of requests for recommendations. For example, the pathway selection engine 566 can receive a request for best pathway by speed (e.g., get_best_hosts_by_speed( ) with IP/24 address, OS version and browser version as parameters for the request). In response, the pathway selection engine 566 provides, for the given set of characteristics, an array of hosts and corresponding speeds (e.g., "Chicago Edge node: 7284, CDN: 3905, Direct: 5932"). Similarly, the pathway selective engine 566 can receive a request for the best pathway for an upload/download (e.g., get_best_host( ) with IP/24 address, OS version and browser version as parameters for the request). In response, the pathway selection engine 566 provides the best pathway by speed for the given set of characteristics (e.g., "Chicago Edge node" based on the above example). Other modes of recommendation such as recommendation by votes, upload type, connection type, file size, criticality of upload data, type of account (e.g., personal or enterprise account), type of account (e.g., free or paid), and/or the like may be implemented by the optimization parameter configuration module 564 and/or the pathway selection engine 566.

In an embodiment, the pathway selection engine 566 selects a pathway using feedback information to optimize or enhance upload and/or download performance. In other embodiments, the pathway selection engine 566 provides feedback information (e.g., pathway options) to a client device to use in selecting a pathway to optimize or enhance upload and/or download performance. The selection of a pathway is based on information from the feedback aggregator engine 552 stored in the memcache 504. The pathway selection engine 566 can select an upload/download pathway based on various methods or algorithms. In an embodiment, the pathway selection engine 566 implements a weighted random selection algorithm via the weighted random selection-based engine 570. The weighted random selection-based engine 570 can select a faster pathway more frequently than a slower pathway based on the weights associated with the pathways. As an example, the upload speed through pathway A is 2 mbps and the upload speed through pathway B is 1 mbps. The weighted random selection-based engine 570 can select pathway A with a probability of (2/(2+1)) or ⅔ and pathway B with a probability of (1/(2+1)) or ⅓. Thus the faster pathway is selected more frequently than the slower pathway, but once in a while the slower pathway is also tried to check if the speed has improved. This effect can be enhanced by increasing the exponent for the weights. For example, when the speed of pathways A and B are each squared, the weighted random selected-based engine 570 can select pathway A ($2^2$) or 4 out of ($2^2+1^2$) or 5 times, and pathway B, ($1^2$) out of ($2^2+1^2$) or 5 times. Similarly, when using a cubed factor, the speed of pathway A and pathway B can be cubed and added together to determine the total weight of ($2^3+1^3$) or 9. The weighted random selection-based engine 570 can have ($2^3$) or 8 out of 9 files be upload through pathway A, and ($1^3$) or 1 out of 9 files be uploaded through pathway B. This method keeps most uploads pointed to the fastest or faster known pathways, while collecting data from other pathways. When network shifts, the weighted-random selection-based engine 570 can detect any change in upload speeds associated with the pathways and adjust its recommendation accordingly.

In an embodiment, the size of the file to be uploaded or downloaded can be factored in when computing the weights such that the higher weights are associated with increasing file sizes. The weighting can be configured and tweaked such that files over a certain size would approach utilization of the currently fastest known host at near 100% of the time. In some instances, a file size threshold can be set such that files reaching or exceeding the threshold size get uploaded or downloaded via the fastest known host. In general, the threshold size is configurable based on the client, customer, subscription or other criteria.

In an embodiment, the pathway selection engine 566 can select a pathway based on equal probability via the equal probability based pathway selection engine 568. In other words, this method accords each of the pathways equal weight, such that each pathway has an equal probability of being selected for an upload or download.

In an embodiment, a mode change trigger detector 571 can switch between the equal probability based pathway selection engine 568 and the weighted random selection-based engine 570 based on one or more criteria such as availability of data. For example, when a given set of characteristics (i.e., IP/platform/browser) lacks a minimum number of data points (e.g., upload speeds for at least two hosts), the pathway selection engine 566 does not have enough information to determine which host is faster or better pathway. The pathway selection engine 566 then uses a round-robin method to select a pathway, which may or may not be the optimal pathway. The mode change trigger detector 571 can detect when enough information or minimum number of data points has accumulated (e.g., in the memcache) and can shift the pathway selection methodology from the equal probability based selection to weighted random selection. In another embodiment, the mode change trigger detector 571 can include a throttling detector (not shown) that can detect whether a connection being throttled or has a bandwidth cap or other limitations that can prevent optimization of the upload/download performance. If the throttling detector detects that a connection is throttled (e.g., based on speed test results reported by the client device), the mode change trigger detector 571 can trigger the equal probability-based pathway selection engine 568.

In an embodiment, the feedback loop optimizer 550 includes the pathway selection configuration module 574. The configuration module 574 can include several options for configuring or customizing the pathway selection engine 566. For example, the configuration module 574 can be used to set the minimum number of data points for a given set of characteristics needed to shift from equal probability-based pathway selection method (via engine 568) to weighted random choice-based selection (via engine 570). The configuration module 574 can also be used to define an analysis window. An analysis window defines the number of days (e.g., 7 days or any other time period such as 24 hours) of data that can be considered when the pathway selection engine 566 is recommending a best host for a client matching a given set of characteristics. The data corresponding to the analysis window can then remain in the memcache, making access to the data much faster. The configuration module 574 can also be used to configure the exponent setting for determining the weights for nodes. Any exponent including a square, a cube, and so on may be utilized by the weighted random choice-based selection engine 570 in determining an optimal host for upload/download. The configuration module 574 may also be used to configure a recommendation time to live (TTL) value. The recommendation TTL value can specify how long the recommendations or selections from the pathway selection engine 566 can be cached and reused by clients. For example, an array of hosts and corresponding weights for the array of hosts provided as recommendation by the pathway selection engine 566 can have a TTL value of 24 hours. The client device can use the cached weights during the 24-hour period to determine an upload host each time a file is to be uploaded, obviating the need to request the host server to provide a recommendation before each upload. Thus caching of recommendations or selections can help avoid expensive recalculations, or the need to request a pathway or weights for pathways each time a file is to be uploaded/downloaded.

In an embodiment, the pathway selection configuration module 574 includes an opt out (or opt in) module (not shown). Using the opt out module, certain users can opt out of certain classifications of host or accelerator nodes. For example, certain users can opt out of Akamai CDN. Thus, for those users, the Akamai CDN is removed from the eligible hosts list prior to running the pathway selection engine 566. In one implementation, opt out can be a preference that is specified by the user (e.g., via a user request when requesting for a host recommendation). In another implementation, the opt out may be system configured. For example, users who pay for the services provided by the host server can be recommended a host from a first list of hosts that includes direct pathway, CDN servers and edge servers. Similarly, users who do not pay for the services provided by the host server can be recommended a host from a second list of hosts (e.g., a shorter or different list of hosts). For example, "free users" can be recommended a host from a list that includes direct pathway and edge servers. In some embodiments, opt in/opt out configuration may be based on other attributes such as type of user account (e.g., enterprise or personal), geography, membership duration (e.g., users for 6 months), promotions, and the like.

Figure 6A:
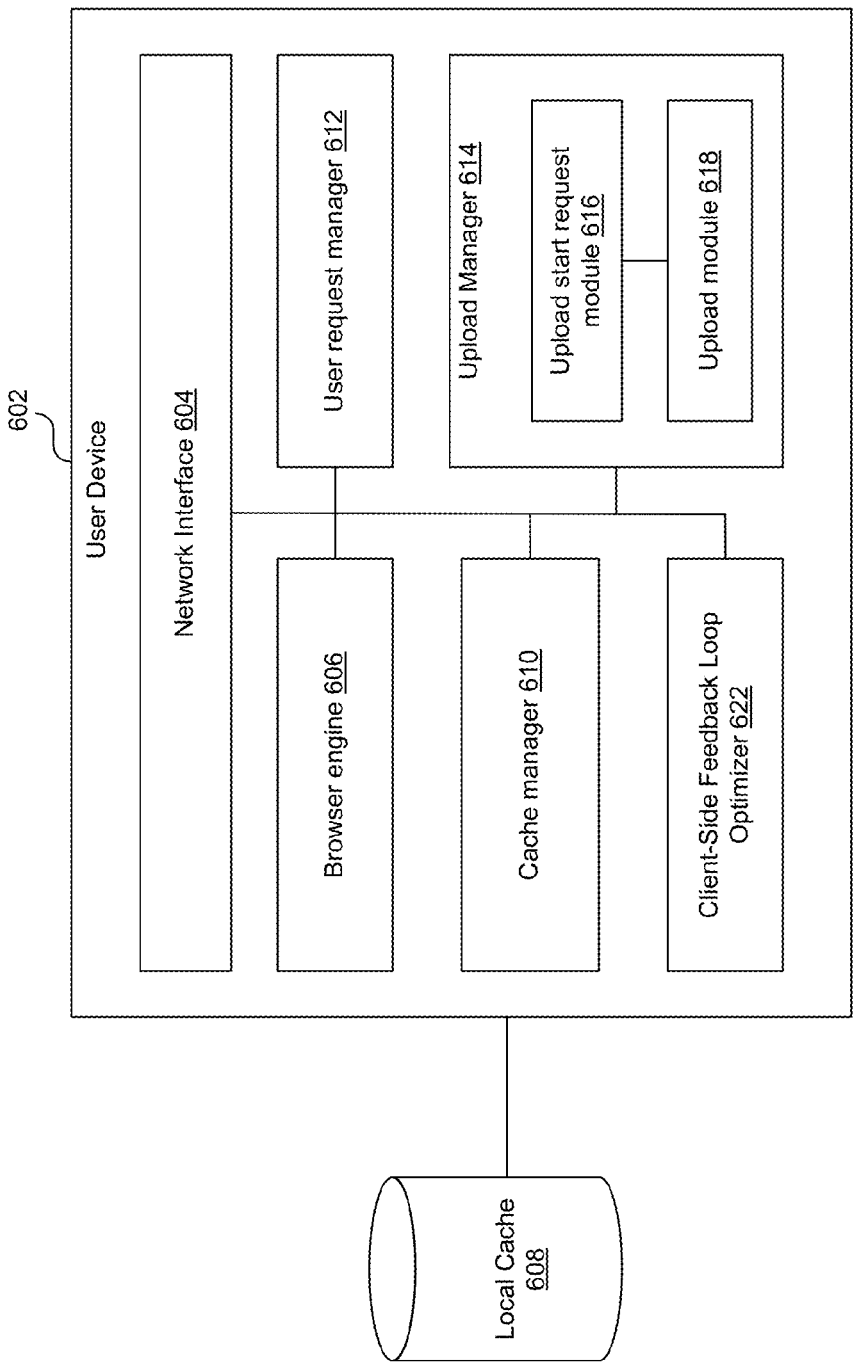
FIG. 6A illustrates a block diagram depicting example components of a user device that provides some of the feedback information that is used by a host server to select a pathway to upload/download files to optimize or enhance upload and/or download performance. The user device can further use feedback information determined client-side to select a pathway to upload/download files to optimize or enhance upload and/or download performance.
Figure 6B:
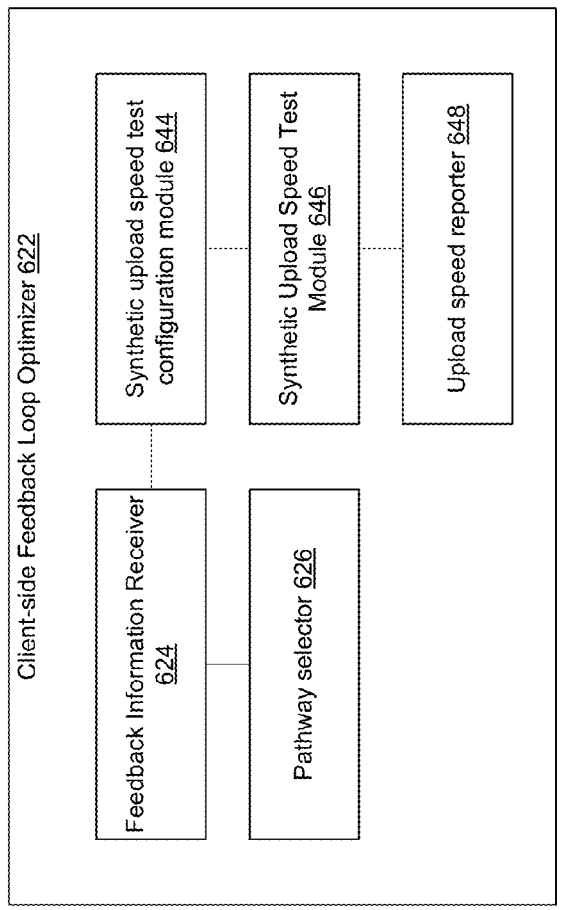
FIG. 6B illustrates a block diagram depicting example components of a client-side feedback loop optimizer of FIG. 6A.

FIG. 6A illustrates a block diagram depicting example components of a user device 602 (e.g., user device 102 in FIG. 1) that provides some of the feedback information that is used by a host server (e.g., host server 500 in FIG. 5A) to select a pathway to upload/download files to optimize or enhance upload and/or download performance. FIG. 6B illustrates a block diagram depicting example components of a client-side feedback loop optimizer of FIG. 6A.

In an embodiment, the user device 402 includes components such as a network interface 604, a browser engine 606, a cache manager 610, a user request manager 612, an upload manager 614 having an upload start request module 616 and an upload module 618 and/or a client-side feedback loop optimizer 622. Additional or less components may be included in the user device in other embodiments. It should be noted that the user device 602 can process upload requests, download requests and/or both upload and download requests via the illustrated components or separate components that are similar to the illustrated components.

The network interface 604 may be a networking module that enables the user device 602 to mediate data in a network with an entity that is external to the host server, through any known and/or convenient communications protocol supported by the host server and the external entity. The network interface 604 can include one or more of a network adaptor card, a wireless network interface card (e.g., SMS interface, Wi-Fi interface, interfaces for various generations of mobile communication standards including but not limited to 1G, 2G, 3G, 3.5G, 4G, LTE), Bluetooth, a router, an access point, a wireless router, a switch, a multilayer switch, a protocol converter, a gateway, a bridge, a bridge router, a hub, a digital media receiver, a repeater, and/or the like.

As used herein, a "module," a "manager," a "optimizer," an "interface," an "engine" or a "system" includes a general purpose, dedicated or shared processor and, typically, firmware or software modules that are executed by the processor. Depending upon implementation-specific or other considerations, the module, manager, receiver, interface, selector, engine or system can be centralized or its functionality distributed. The module, manager, receiver, interface, selector, engine or system can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The user request manager 612 can detect, receive, manage, process, identify any request to upload one or more files/folders to the host server (or another remote device or server) and/or download remotely hosted or stored files/folders at the user device 602. Detection of the upload/download request can cause other components to request and receive identification of a suitable host through which the files can be uploaded from the user device 602 to the host server or downloaded from the host server to the user device 602.

In an embodiment, the upload manager 614 can receive information regarding a pathway or an array of pathways from the host server, and upload one or more files to the identified pathway. The upload start request module 616 can send a request or a message to notify the host server that an upload is about to start. In an embodiment, the upload start request can also serve the purpose of notifying the host server regarding the upload about to occur so that the host server can track the upload for any failures. In an embodiment, the upload start request module 616 may make an explicit request for a host recommendation so that the user device can upload to the recommended host and obtain better upload performance and user experience. The upload start request module 616 may generate and send the request in the form of an HTTP, API or other request. The request may include information about the user device 602 and/or the upload itself. For example, the upload start request can include an IP address of the user device, OS name and version and/or the browser name and version. In some implementations, the upload start request can further include number of files selected for upload, size of files (total size and/or size per file) selected for upload, user device make and/or model, user details (e.g., user/enterprise ID), and the like. The host server can receive the upload start request and in response, can recommend a host to upload to or provide information that the user device can use to select a host to upload to. The feedback information from the host server can be received by the feedback information receiver 624 of the client-side feedback loop optimizer 622 illustrated in FIG. 6B. The feedback information can include an identification of the pathway to which the user device can upload to and/or weights (or ratios) for an array of pathways to use in selecting a pathway to upload to. In an embodiment, the feedback information from the host server can be associated with a timing attribute (e.g., TTL value) that indicates how long the information is considered valid or usable. For example, the feedback information can remain valid or usable for up to 2 hours, 12 hours, 24 hours, 2 days, 7 days, etc. The timing attribute for the feedback information can be configured by the host server and/or the user device. The feedback information along with the timing attribute can be stored in a local cache 608 by the cache manager 610. Caching the feedback information from the host server means that the user device does not have to request and/or wait for a recommendation before each upload. In an embodiment, whenever there is a change in network conditions (e.g., upload speed at host B has changed such that host B is now faster than host A), updated feedback information can be pushed by the host server to the user device 602. The updated feedback information can also be received by the feedback information receiver 624.

In an embodiment, the feedback information identifies a specific host or pathway to which files are to be uploaded by the user device. For example, assuming that speed is the factor being optimized and the user device has a choice of three pathways A, B and C for uploading files, the host server can determine that pathway A is the fastest of the available options for upload, and can thus recommend pathway A (e.g., IP address or a URL such as upload.xyz.com) for use by the user device in uploading files. In this example, the upload module 618 can upload the files to pathway A recommended by the host server.

In an embodiment, the feedback information does not identify a specific pathway to upload to, but includes weights or weighting information that the pathway selector 626 of the client-side feedback loop optimizer 622 can utilize to select a pathway to upload to. For example, using a web application, the user device 602 can send a request to get an upload host suggestion from the feedback loop of the host server. Assuming that speed is the factor being optimized, and for a given combination of IP address/browser/OS factors, the user device has a choice of three pathways A, B and C for uploading files. The host server can then provide upload speeds clocked at pathways A, B and C as a response to the request from the user device. An example of the response from the host server can be substantially similar to: "A: 7284, B: 3905, C: 5932" where the speeds are in kbps. The pathway selector 626, in an example implementation, can normalize, square and round off the upload speeds at the nodes to obtain weights for the array of pathways substantially similar to: "A: 3, B: 1, C: 2". The pathway selector 626 can then select pathway A for uploading files 3 out of 6 times (sum of 3, 1 and 2), select pathway B 1 out of 6 times and pathway C 2 out of 6 times. The upload module 618 can then upload the files through the selected pathways.

In an embodiment, instead of speed, an array of pathways with weights may be received as feedback information by the feedback information receiver 624. For example, the feedback information may appear substantially similar to:

upload.xyz.com => 7
fupload1.xyz.com => 1
fupload-ord.xyz.com => 2

The pathway selector 626 can use the random weighted selection method described with reference to the weighted random choice-based selection engine 570 of the server-side feedback loop optimizer 550 in FIG. 5A. Using the random weighted selection method, the pathway selector 626 can select the host upload.xyz.com to upload most of the files ($7^2$, or 49 out of $7^2+1^2+2^2$, or 54). Similarly, the pathway selector 626 can select the host fupload-ord.xyz.com for uploading some of the files ($2^2$, or 4 out of 54), and host fupload1.xyz.com for uploading at least one file ($1^2$, or 1 out of 54).

In an embodiment, when a web application is being used to upload files, the JavaScript in the web application can include an array of hosts with weights instead of a single host. The browser engine 606 can execute the JavaScript to select a host according to the weights to upload a file. For example, on each upload, the browser engine 606 can perform an operation substantially similar to the example below to select a host according to the weights for upload:
rand(0 to 1)*(sum of weights)

The array and/or the weights can have an associated expiration timestamp (e.g., TTL value) and a new set of hosts and corresponding weights can be fetched from the host server before an upload when the array of hosts/weights expires.

In an embodiment, instead of using feedback information from the host server to determine a pathway to upload to, the user device can utilize client-side feedback loop optimizer to select a pathway to enhance upload performance. The client-side feedback loop optimizer 622 can obtain client-side feedback information by conducting a synthetic upload speed test via a synthetic upload speed test module 646. The synthetic upload speed test module 646 can include a connection diagnostic tool (e.g., tools similar to those provided by speedtest-.net, Comscore, Akamai) that generates random data (dummy data) and uploads the dummy data to an array of hosts including a server that is local (or in geographically proximity) to the user device to determine upload speeds associated with the array of hosts. Uploading of dummy data to a local server allows the synthetic upload speed test module 646 to determine the theoretical maximum upload speed for the user device and/or connection. The synthetic upload speed test can be run in the background when triggered. The synthetic upload speed test module 646 may be browser-based or may be part of an application or client installed on the user device.

A synthetic upload speed test configuration module 644 can determine when to initiate a synthetic upload speed test. In embodiments where the pathway selector 626 relies only on client-side feedback information, the synthetic upload speed test module 646 may perform speed tests periodically and cache the results for some time for reuse, or may perform a speed test before each upload and provide the results to the pathway selector 626 to select a pathway that optimizes upload performance. In other embodiments, the synthetic upload speed test configuration module 644 may be configured to trigger the synthetic upload speed test module 646 to obtain upload speed data associated with uploads to the array of hosts when the host server does not have enough data for a given combination of characteristics to compute a recommendation. The upload speed measured by the synthetic upload speed test module 646 can then be reported to the host server via the upload speed reporter 648. The upload speeds reported by the user device can be aggregated by the host server. For example, the host server can insert the upload speed measured client-side into the memcache and/or analytics datastore along with the upload speed measured server-side. The client-side reported upload speed may have a connection diagnostic speed test or other identifier for an upload speed type. The host server can use both types of upload speeds (i.e., measured by the host server and measured by the user device) to determine recommendations.

In an embodiment, the pathway selector 626 can determine the best or fastest pathway for upload based on the synthetic upload speed test results from the synthetic upload speed test module 646. For example, synthetic upload speed test results may indicate that pathway A has an upload speed of 3000 KB/s, pathway B has an upload speed of 1000 KB/s and pathway C has an upload speed of 100 KB/s, therefore the pathway selector 626 can utilize a weighted random selection method or any suitable method to select the best or fastest pathway for upload. In this example, the pathway selector 626 can select pathway A with a probability of approximately 0.9, pathway B with a probability of approximately 0.1 and pathway C with the lowest probability of approximately 0.001, such that most of the uploads from the user device go through the fastest or faster pathways, thereby enhancing the upload performance. Once an optimal pathway is selected for upload, the upload manager 614 containing the upload module 618 can upload the file to the selected pathway.

In an embodiment, the client-side feedback loop optimizer 622 includes a host reachability test module (not shown) that can detect or determine if an upload/download pathway is unreachable. The host reachability module may detect the unavailability of upload/download pathways when attempting to connect to the pathways, performing a speed test, based on error messages (e.g., server unavailable message), and the like. When an upload/download pathway is determined to be unreachable or unavailable, the host reachability test module can report this information to the host server. The host server, on receiving the report, can execute the pathway selection engine 566 to determine a new pathway or weights, with the unreachable or unavailable host removed from the set of eligible hosts. For example, if the CDN pathway is down, the host server can select a suitable pathway from remaining options available (e.g., the direct pathway and edge servers) for upload. This feedback information regarding unavailability of hosts ensures reliable uploads/downloads and preserves user experience in instances where users are behind misconfigured or aggressive firewalls, or where there is a problem with an edge server or CDN server, or even when the host server is having difficulties. In some instances, detection of the unavailability or unreachability of a host can be a trigger for the client-side feedback loop optimizer to fetch new weights (taking into account the host that is unavailable) to update the local cache. In some embodiments, the functions of the host reachability test module may be performed server-side by the host server (e.g., host server 500).

In addition to web uploads/downloads, the feedback loop optimization techniques can also be applied to uploads/downloads using sync clients, APIs, FTP, and other communication methods. For example, any applications (e.g., mobile applications) on the user device (e.g., mobile device) having files to be uploaded to the host server can utilize API requests to directly request recommendation for the best host or the fastest host from the host server and upload to the recommended host.

Figure 7B:
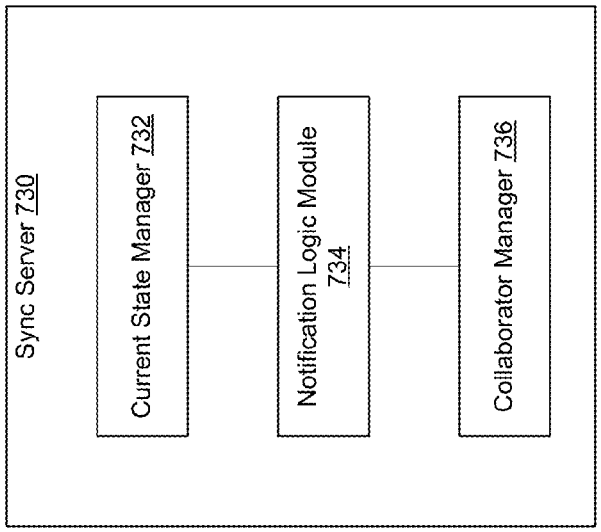
FIG. 7B illustrates a block diagram depicting example components of a sync server that communicates with the sync client of FIG. 7A.
Figure 7A:
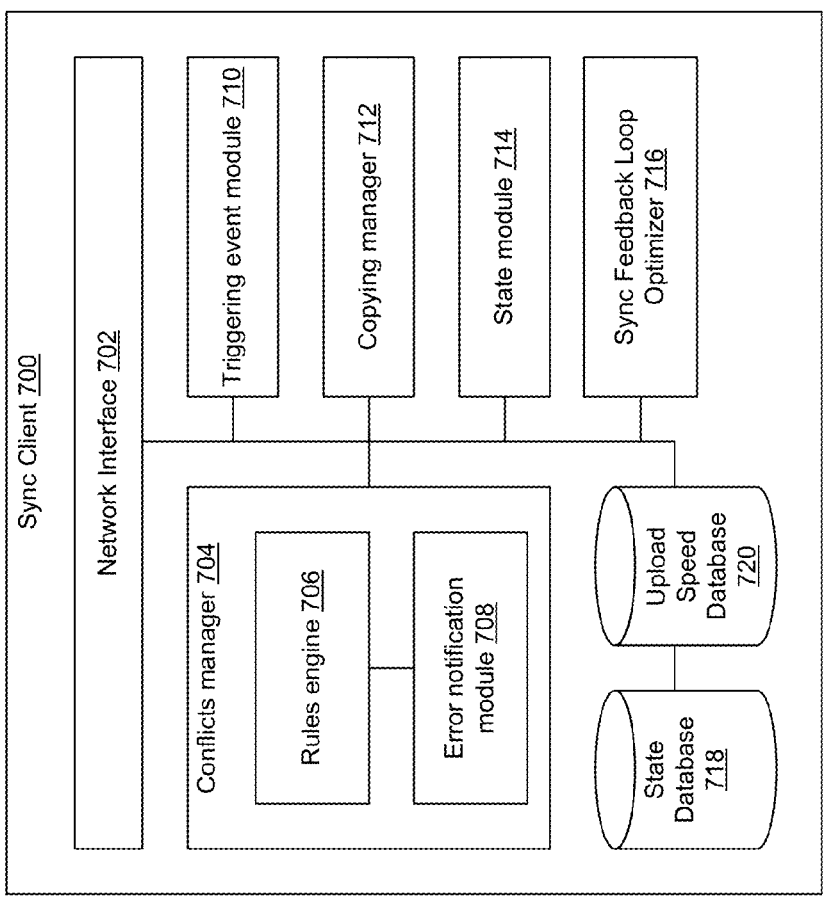
FIG. 7A illustrates a block diagram depicting example components of a sync client that can use feedback information to select a pathway to optimize or enhance upload performance.

FIG. 7A illustrates a block diagram depicting example components of a sync client 700 running on a user device (e.g., user device 102 of FIG. 1A or user device 602 of FIG. 6A) that synchronizes copies of work items stored on the user device with copies of work items stored in a sync server 730, sync folder and/or a host server (e.g., host server 100 of FIG. 1) within a cloud-based collaboration environment. Example components of the sync server 730 are illustrated in FIG. 7B.

The sync client 700 can include, for example, a conflicts manager 704, a triggering event module 710, a copying manager 712, a state module 714, and/or a state database 718. The conflicts manager 704 can include a rules engine 706 and/or an error notification module 708. The sync client 700 can also include a sync feedback loop optimizer 716 (e.g., upload route via client-side feedback loop optimizer 622 in FIG. 6A). Additional or fewer components/modules/engines can be included in the sync client 700 and each illustrated component.

One embodiment of the sync client 700 includes the triggering event module 710 which determines when synchronization of folders should occur. There are two types of triggering events for synchronization. The first type of triggering event occurs when a change has been made to the server sync folder. As a result of this event, a notification is sent from the notification server 150 to the triggering event module 710. In some instances, when a user has an application open and edits a file in the server sync folder, editing of the file causes the notification server 150 to send a notification to the triggering event module 710, causing the change to be downloaded to the local sync folders of other collaborators as part of the synchronization function. The download can occur via a pathway that provides the best download performance for a given set of characteristics associated with the user device and/or connection of the collaborators of the folders. In some instances, the notification is sent to the triggering event module 710 after the user has saved the file and closed the application.

The notification server 150 can provide real time or near real-time notifications of activities that occur in a particular server sync folder. In one embodiment, the triggering event module 710 can subscribe to a real-time notification channel provided by the notification server 150 for a particular server sync folder to receive the notifications.

In one embodiment, the notifications provided by the notification server 150 inform the triggering event module 710 that a change has occurred in the server sync folder. In this case, the state module 714 requests from the current state manager 732 in the sync server 730 the current state of the folder/file tree for the server sync folder that the local sync folder is synchronized to.

The state module 714 also accesses the last known state of the folder/file tree stored in the state database 718 and compares the current state with the last known state to determine which file and/or folder has changed. Once the changed files and/or folders have been identified, the copying manager 712 downloads the changed file(s) from the server sync folder to the local sync folder. The downloading can be through a pathway recommended by the host server for a given set of characteristics or determined by the sync feedback loop optimizer 716. The second type of triggering event occurs when a change has been made to a local sync folder on a collaborator's computer or user device. In one embodiment, a Windows operating system of the collaborator's computer provides file/folder monitoring on the computer and notifies the triggering event module 710. Other operating systems or programs running on collaborators' computer systems can provide a similar type of notification to the triggering event module 710. Once the triggering event module 710 has been notified of the change to the local sync folder, a notification is sent to the sync server 730.

When the second type of triggering event occurs, the copying manager 712 uploads the changed file to replace the copy of the file stored in the server sync folder. The changed file can be uploaded through a pathway that is recommended by the host server and/or the user device based on feedback information for a set of characteristics that are applicable to the user device (e.g., via the sync feedback loop optimizer 716). Once the file has been uploaded to the server sync folder, the local copy of the file stored on the computers of other collaborators in the workspace whom have enabled the synchronization function are updated in a similar manner as described above for the first type of triggering event.

An embodiment of the sync client 700 includes the conflicts manager 704 which can identify when a conflict has occurred (i.e., a file or work item has been changed at both the server sync folder and the local sync folder) and determine how to resolve the conflict. If the triggering event module 710 receives a notification from the notification server 150 and the local file/folder monitoring system of the changes, the conflicts manager 704 identifies the changes made to the file/folder at each location. In one embodiment, the conflicts manager 704 calls the rules engine 706 to determine what action to take to resolve the conflict. The rules engine 706 stores rules for resolving conflicts. Rules are predefined but can be changed without changing the software implementing the rules engine. The rules engine 706 takes as input the types of changes that have occurred at the various synchronized folders such as edits to a work item, renaming of a work item, or moving of a work item to a different location. Then the rules engine 706 provides the action to be performed for the particular conflict.

There are two types of conflicts: a soft conflict and a hard conflict. A hard conflict occurs when the same operation occurs on both copies of the file, and a soft conflict occurs when a different operation occurs on each of the two copies of the file. In the case of a hard conflict, for example, when copies of a work item have been changed at the server sync folder and at a local sync folder, the conflicts manager 704 is not able to merge the changed files. In one embodiment, the conflicts manager 704 makes a copy of the changed work item in the local sync folder and renames the copy with the original file name and an identifier of the collaborator associated with the local sync folder. Next, the conflicts manager 704 downloads (e.g., via an optimal pathway suggested or determined by the sync feedback loop optimizer 716) the changed work item from the server sync workspace to the local sync folder, and then uploads (e.g., via an optimal pathway suggested or determined by the sync feedback loop optimizer 716) the copy of the work item with the modified file name to the server sync folder. Thus, two versions of the file are stored at the server sync folder and the local sync folder. Then, the error notification module 708 sends a message to the user to notify him that the changes in his version of the work item were not accepted but were uploaded to the server sync folder as a new version of the file with a new file name and requests the user to merge the two files manually. In the case of a soft conflict, for example, when a file is moved on the server and edited locally, the conflicts manager 704 can merge these two changes so that the file is moved locally to the new location and the local edits are uploaded to the server copy of the file.

In some embodiments, the sync server 730 may also include a feedback loop optimizer performing functions similar to the feedback loop optimizer 550 in FIG. 5B.

Figure 8:
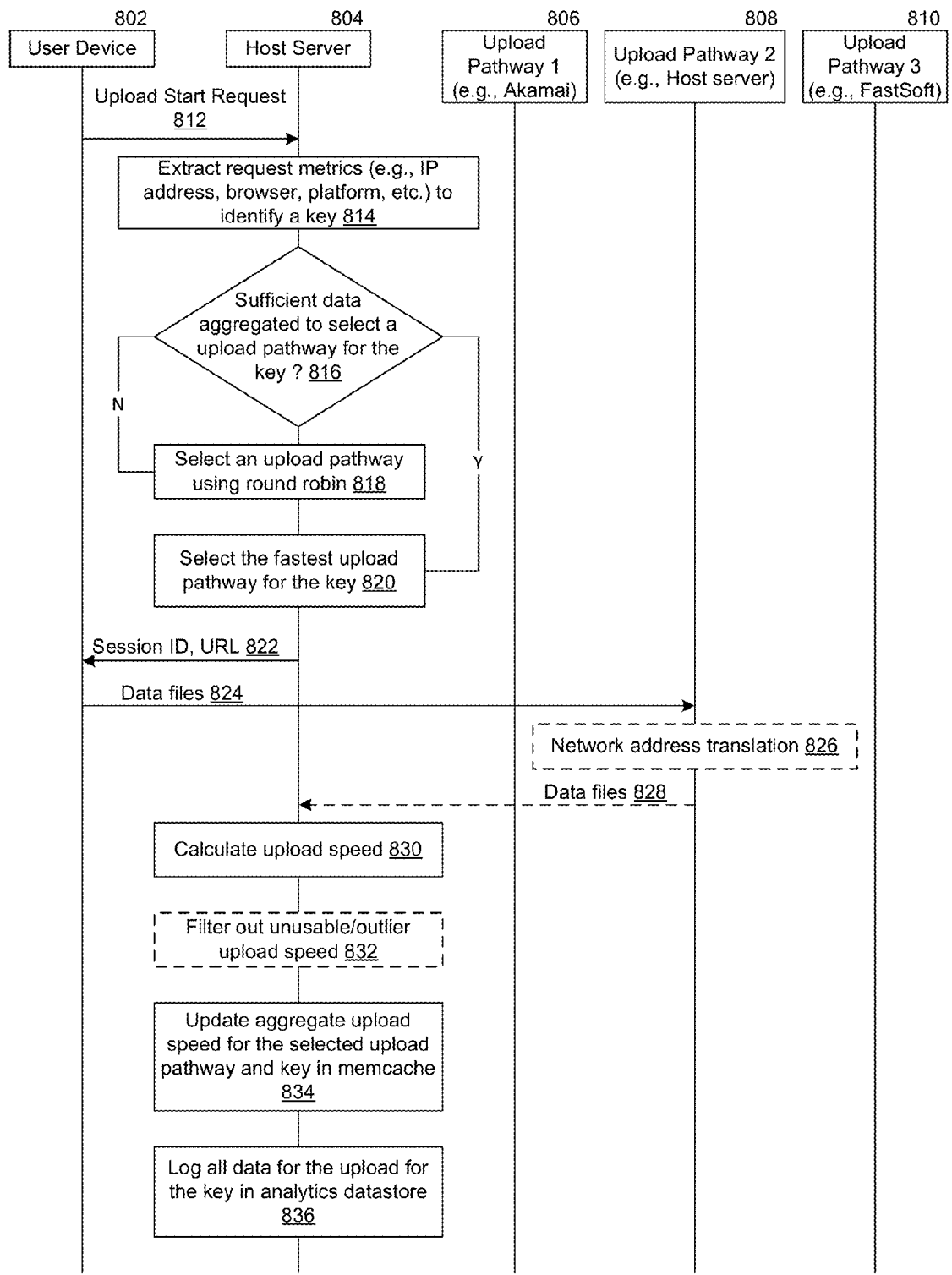
FIG. 8 illustrates an example flow diagram depicting a method implemented by a host server for recommending an upload pathway for a given set of characteristics for a user device to achieve enhanced upload performance.

FIG. 8 illustrates an example flow diagram depicting a method implemented by a host server 804 (e.g., host server 100 of FIG. 1; host server 500 of FIG. 5A) for recommending an upload pathway for a given set of characteristics for a user device 802 (e.g., user device 102 of FIG. 1) to upload to enhance upload performance.

The user device 802 sends an upload start request 812 to the host server 804. The upload start request 812 can be a request that serves the dual purpose of informing the host server 804 regarding an upload about to start and requesting a recommendation for an upload pathway to upload a file. In some implementations, instead of the upload start request 812, a recommendation request can be made. The upload start request 812 can be an HTTP request (e.g., an HTTP GET/POST request or an API request) or similar request and can include attributes or characteristics of the user device 802. Example characteristics can include a complete or partial IP address (IPv4 or IPv6 address formats), browser name/version, OS name/version, file type, file size, user ID, account type, and the like. The host server 804 receives the upload start request 812 and extracts the user device characteristics from the request to identify a key at block 814. The key corresponds to a set of characteristics such as "01.102.103.XXX, Windows XP SP2, Firefox 4.0". The host server 804, at block 816, determines whether there is sufficient data aggregated to select an upload pathway for the identified key. In some implementations, there may not be sufficient data aggregated to determine that one upload pathway is definitively better or faster than another. For example, upload pathway 1 may have an aggregate speed of 2 MB/s but upload pathways 2 and 3 may have no aggregate speed values. In such an instance, the host server 804 can select an upload pathway with equal probability or round robin method at block 818. The host server 804 can then send a response 822 to the upload start request 812. The response 822 includes an identification of an upload pathway selected without any optimization, using equal probability method. The response 822 can include information such as a session ID, selected upload pathway's URL, IP address, or other identifier or address. In the illustrated example, the host server 804 selected upload pathway 808 (e.g., host server 804). The user device 802 then uploads the data files 824 to the upload pathway 808, which is the host server 804 in this particular example.

Alternately, at block 816, if the host server 804 has sufficient data aggregated to recommend an upload pathway, the host server can select the recommended upload pathway and provide information regarding the recommended upload pathway to the user device 802 in the response 822. Once again, the user device can then upload a file to the recommended upload pathway (pathway 808 in this example). If the selected host pathway 808 is not the host server 804 (i.e., not a direct upload), but a CDN node for example, in such an instance the CDN node can receive the uploaded files. The CDN node can perform a network address translation 826 to route the uploaded data files 828 to the host server 804. In other words, the upload from the user device is initially pointed to the IP address of the CDN node, and the CDN node, on receiving a data packet, rewrites the source IP address and destination IP address to forward the data packet to the host server 804. Since the IP address of the user device 802 can get wiped during network address translation, the session ID can be used to determine the IP address associated with data files 828 received at the host server 804.

The host server 804 upon receiving the data files can calculate the upload speed at block 830 based on the timestamps corresponding to receipt of a first byte and a last byte. In some instances, the calculated upload speed can be unusable or an outlier. The host server 804 can filter out the unusable/outlier upload speed at block 832. At block 834, the host server 804 can update the aggregate upload speed for the selected upload pathway and the key in a memcache. Further at block 836, all the data associated with the upload is stored in association with the key in an analytics datastore.

Figure 9A:
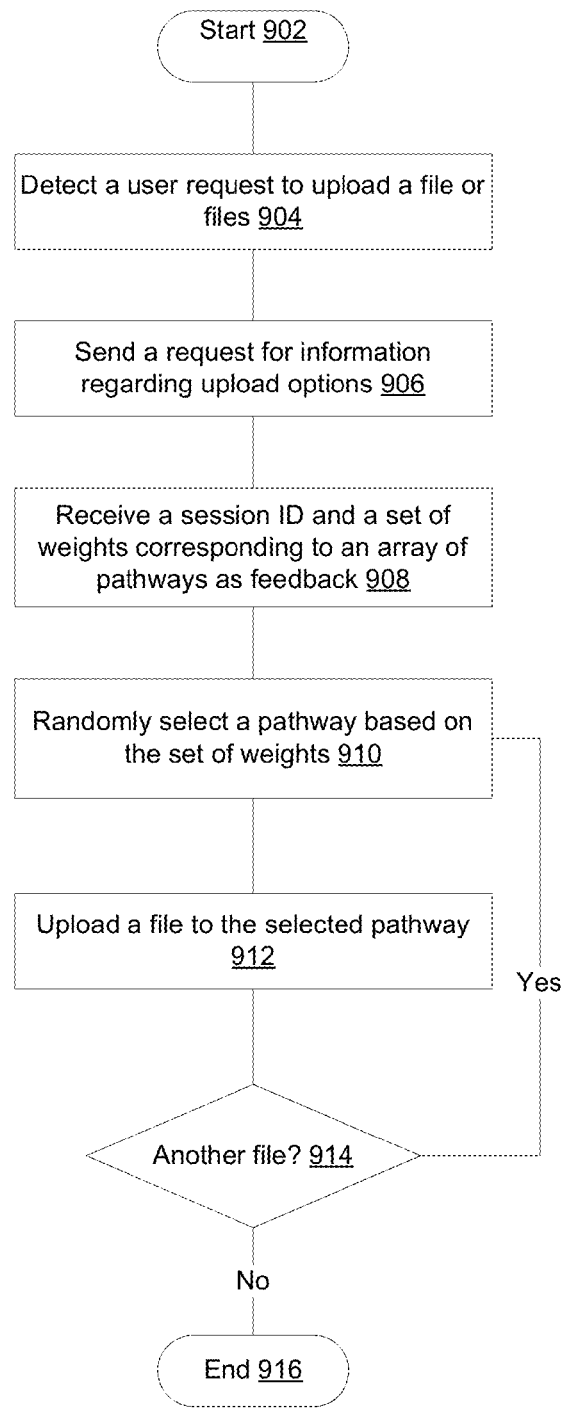
FIG. 9A illustrates an example logic flow diagram depicting a method for selecting a pathway from an array of pathways based on a set of weights to enhance upload/download performance.

FIG. 9A illustrates an example logic flow diagram depicting a method for selecting a pathway from an array of pathways based on a set of weights to enhance upload/download performance.

The method starts at block 902. At block 904, a user device (e.g., user device 102, 602) detects a user request to upload a file or files. In some instances, the request to upload a file or files may be automatically generated (e.g., via sync client 700 for syncing files on the user device with those in the host server). The user device sends a request to a host server (e.g., host server 100 in FIG. 1 or host server 500 in FIG. 5A) for information regarding upload pathways at block 906. The information regarding upload pathways can be used by the user device to select an upload pathway from the group to upload a file. In some implementations, the user device can request the host server to recommend an upload pathway to which the user device should upload a file. The request can include information such as an IPv4 or IPv6 address, browser version, OS version, user ID, file size, file type, and the like. In some implementations, the request can also specify one or more factors to be optimized (e.g., upload speed, upload speed for file size or type, and the like). Alternately, the host server can determine which optimization factor or factors are considered in recommending an upload pathway or an array of upload pathways for upload.

At block 908, the user device receives a session ID and a set of weights corresponding to an array of pathways from the host server as feedback information. The user device then randomly selects a pathway based on the set of weights at block 910. In some instances, the selection of the pathway can be made server-side. In an embodiment, the decision to implement the selection server-side or client-side may be based on various factors such as security, avoiding caching on the user device, use of most current information, and the like. The user device then uploads a file to the selected pathway at block 912. If there are multiple files to be uploaded as determined at block 914, the user device performs another random selection operation to select a pathway based on the set of weights at block 910. Via the random weighted selection approach, the user device achieves upload performance improvement by selecting a pathway that is faster more frequently than a pathway that is slower. At the same time, since the user device can end up trying all the pathway options, any change in the upload speed of any pathways can be detected and taken into account by the host server such that a different set of weights can be provided to the user device for the next upload.

Figure 9B:
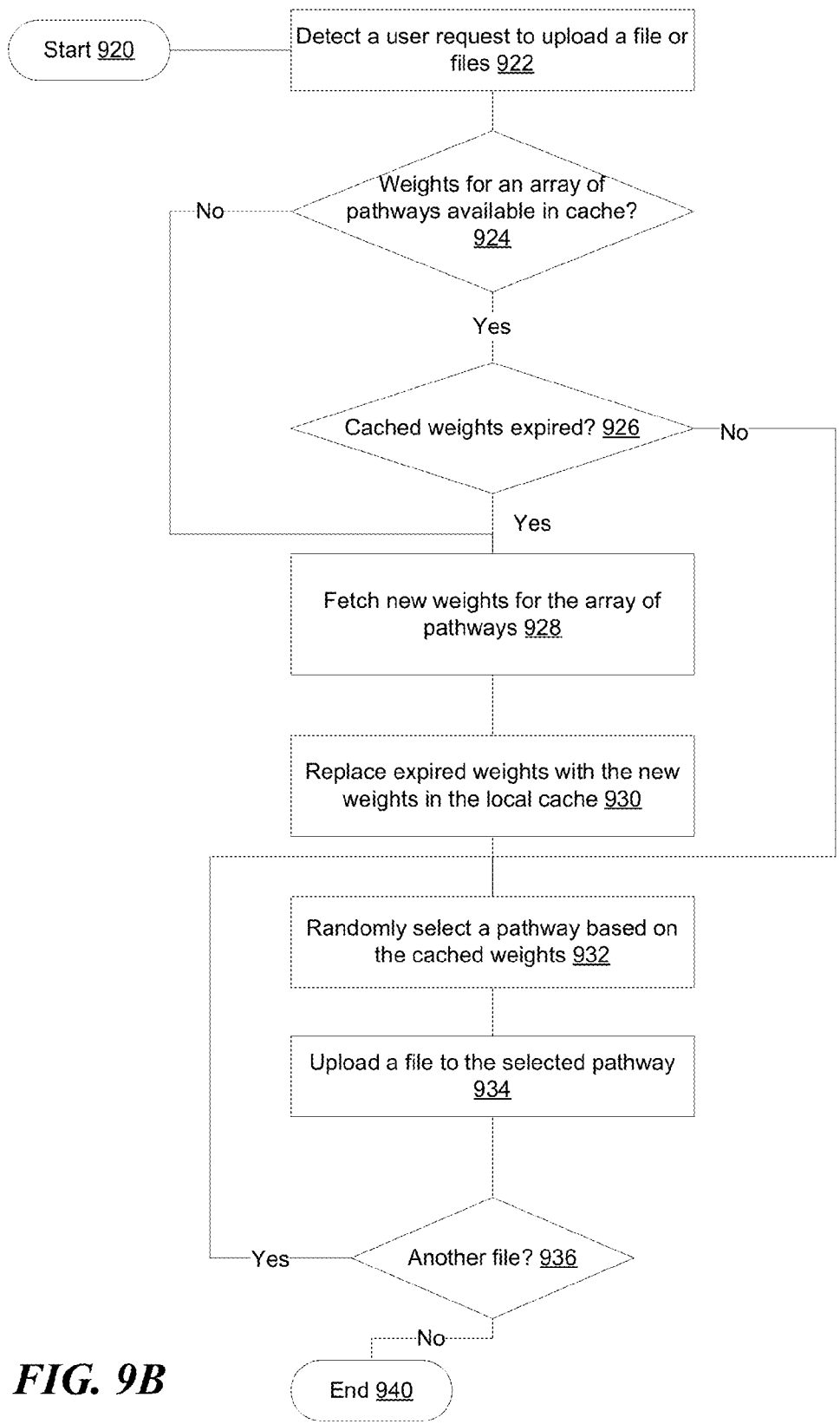
FIG. 9B illustrates an example logic flow diagram depicting a method for selecting a pathway from an array of pathways based on a set of weights cached in a user device.

FIG. 9B illustrates an example logic flow diagram depicting a method for selecting a pathway from an array of pathways based on a set of weights cached in a user device.

The method starts at block 920. A user device (e.g., user device 102 of FIG. 1; user device 602 of FIG. 6A) detects a user request to upload a file or files at block 922. At block 924, the user device determines if the weights for an array of pathways are available in a local cache of the user device. In one implementation, the user device, when looking for weights in the local cache can look for weights corresponding to a set of user device characteristics. In some instances, it is possible for a user to use his or her user device at home (e.g., IP address 123.12.13.XX) and at a coffee shop in another part of the town (e.g., IP address 123.14.15.XX). Since the IP octet part of the set of characteristics can be different for the same user device, the pathways and the corresponding weights for upload from home can be different from the weights for upload from another location. Consequently, consideration of the "home" set of characteristics can lead to a selection of pathway different from consideration of the "office" set of characteristics. If the weights are not available in the local cache, the user device can fetch new weights for an array of pathways at block 928. However, if weights are available, the user device can determine whether the weights in cache are expired at block 926. If the weights are expired, the user device can fetch new weights for an array of pathways for a set of user device characteristics at block 928. The user device then stores the fetched weights in the local cache, replacing the expired weights at block 930.

At block 932, the user device using the new weights fetched from the host server or the weights in the cache that are still usable randomly selects a pathway from an array of pathways. At block 934, the user device uploads a file to the selected pathway. If more than one file is to be uploaded during the same session as determined at block 936, the user device repeats the process at block 932. When there are no other files to be uploaded, the process terminates at block 940.

Figure 10:
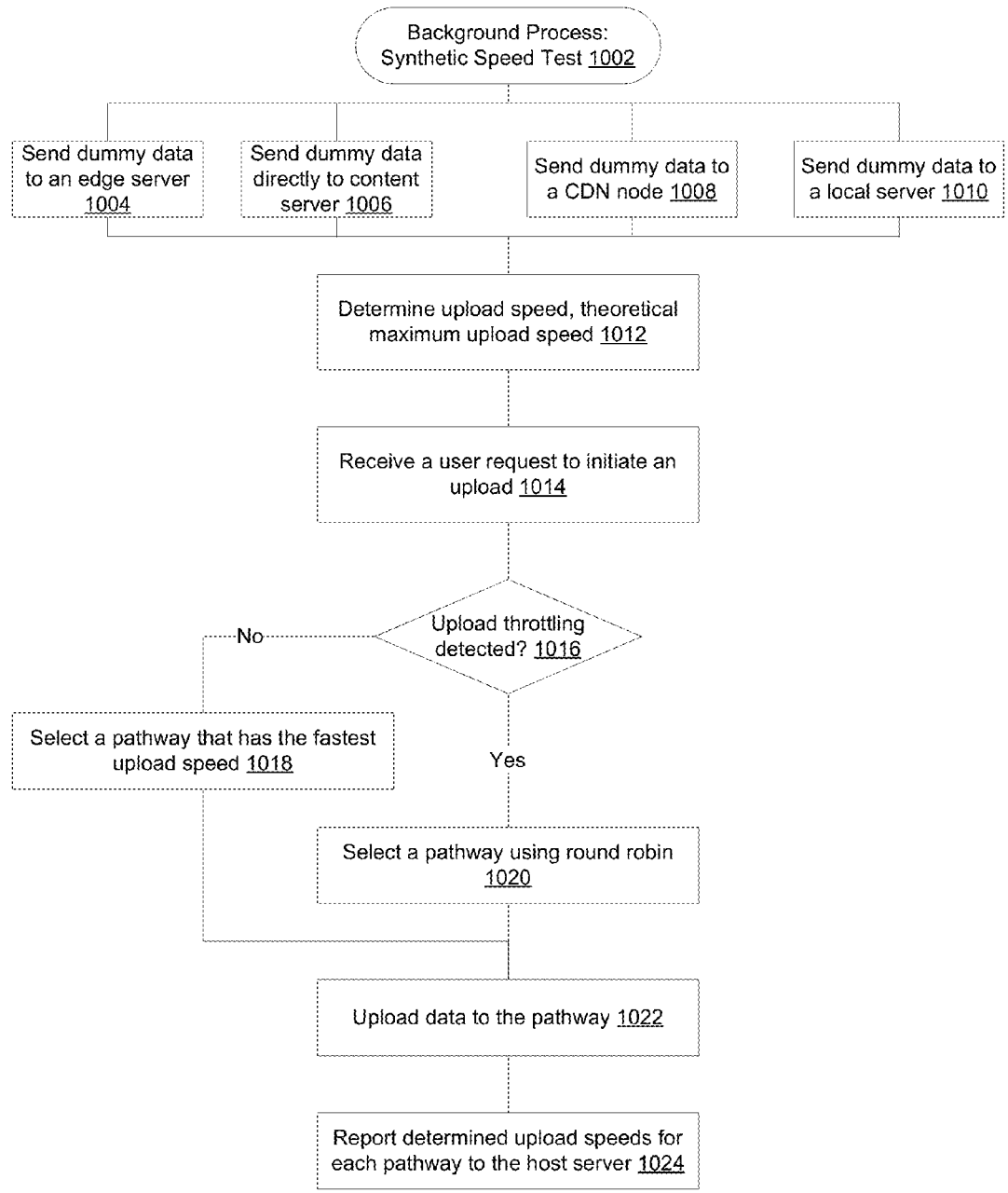
FIG. 10 illustrates an example logic flow diagram depicting a method for selecting an optimal upload pathway by a user device based on client-side feedback information.

FIG. 10 illustrates an example logic flow diagram depicting a method for selecting of an optimal upload pathway by a user device (e.g., user device 102 in FIG. 1; user device 602 in FIG. 6A) based on client-side feedback information.

In an embodiment, the client-side feedback information for selecting an optimal pathway for an upload/download can be aggregated by performing synthetic speed tests (web-based or via a local client on a user device). A synthetic speed test may start as a background process at block 1002. At block 1004, the user device sends dummy data to an edge server located nearby. At block 1006, the user device sends dummy data directly to a host server (e.g., the host server 100 in FIG. 1; host server 500 in FIG. 5A). Similarly, at block 1008 and 1010, the user device sends dummy data to a CDN node and a local server located in geographic proximity to the user device, respectively. The dummy data that is sent to these pathways are the same size/type and may be sent at approximately the same time. At block 1012, the user device determines upload speed through each of the pathways based on the total size of the data uploaded and duration of the upload. The upload speed to the local server can be taken as the theoretical maximum upload speed possible for the given connection. The upload speeds at the edge server, the host server and the CDN node will generally be lower than the upload speed at the local server. The theoretical maximum upload speed can thus be used to identify upload speeds measured at other pathways that may be outliers or erroneous. In one implementation, the upload speed that is calculated at block 1012 can be an aggregate or average speed (e.g., test can be repeated a number of times and an average of the results may be considered). Alternately, other methodology for determining upload/download speeds can be used. For example, the upload speed (or connection speed) can be first estimated by sending dummy data to a pathway. Based on the estimated speed, appropriately sized chunks can be pushed to the pathway. The chunks can be sorted by speed and speeds corresponding to a range (e.g., 30th percentile to 90th percentile) can be selected and averaged to determine the upload speed.

At block 1014, the user device receives a user request (or an automated request) to initiate an upload. In an embodiment, the user device can detect throttling or bandwidth capping. When the speeds across multiple pathways are similar, the user's Internet connection is likely subject to upload throttling or bandwidth capping, causing the uploads to be limited to the same speed, regardless of the pathway selected. At block 1016, if the user device detects upload throttling, the user device can select an upload pathway using round robin method at block 1020. Alternately, if there is no upload throttling, the user device can select an upload pathway that has the fastest aggregate upload speed at block 1018. In some implementations, the user device can also select an upload pathway based on weights determined from the upload speeds from the upload pathways. At block 1022, the user device uploads data to the selected upload pathway. Further, at block 1024, the user device can report the aggregate upload speeds determined for each upload pathway to the host server.

Figure 11:
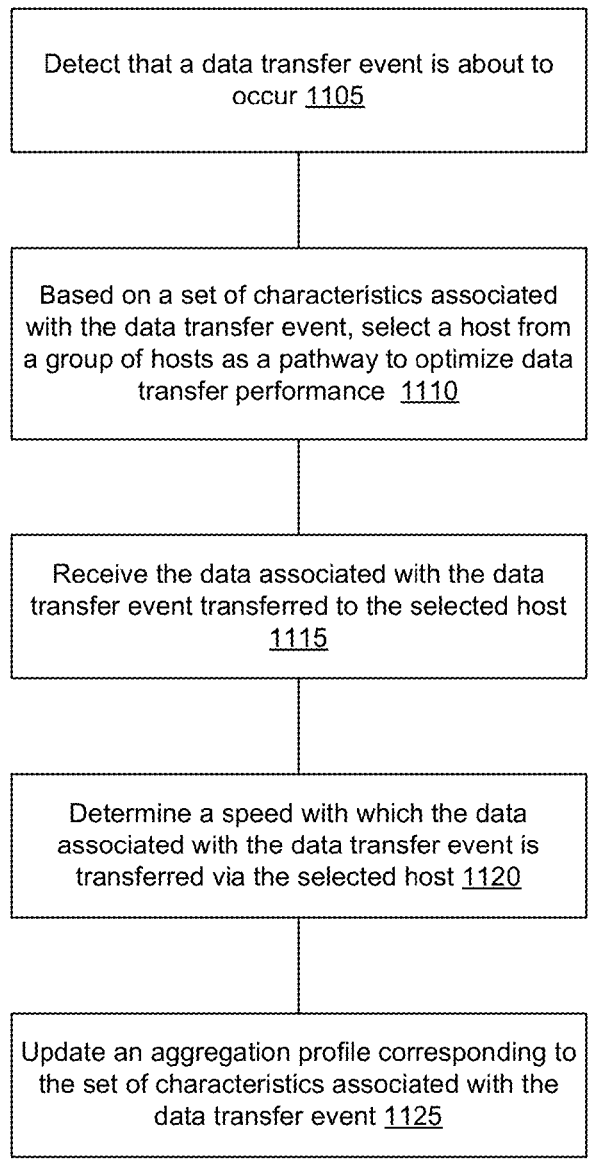
FIG. 11 illustrates an example logic flow diagram depicting a method for using feedback information to optimize data transfer performance.

FIG. 11 illustrates an example logic flow diagram depicting a method for using feedback information to optimize data transfer performance. In an embodiment, a user device and/or a host server can detect that a data transfer event is about to occur at block 1105. The data transfer event may be an upload event or a download event. Based on a set of characteristics associated with the data transfer event, the user device and/or the host server can select a host from a group of hosts as a pathway to transfer the data to optimize data transfer performance at block 1110. At block 1115, the data associated with the data transfer event transferred to the selected host can be received at the host server and/or the user device. At block 1120, a speed with which the data associated with the data transfer event is transferred through the selected host is determined by the host server and/or the user device. An aggregation profile corresponding to the set of characteristics associated with the data transfer event can be updated at block 1125. The aggregation profile may be stored at the host server and/or the user device.

Figure 12:
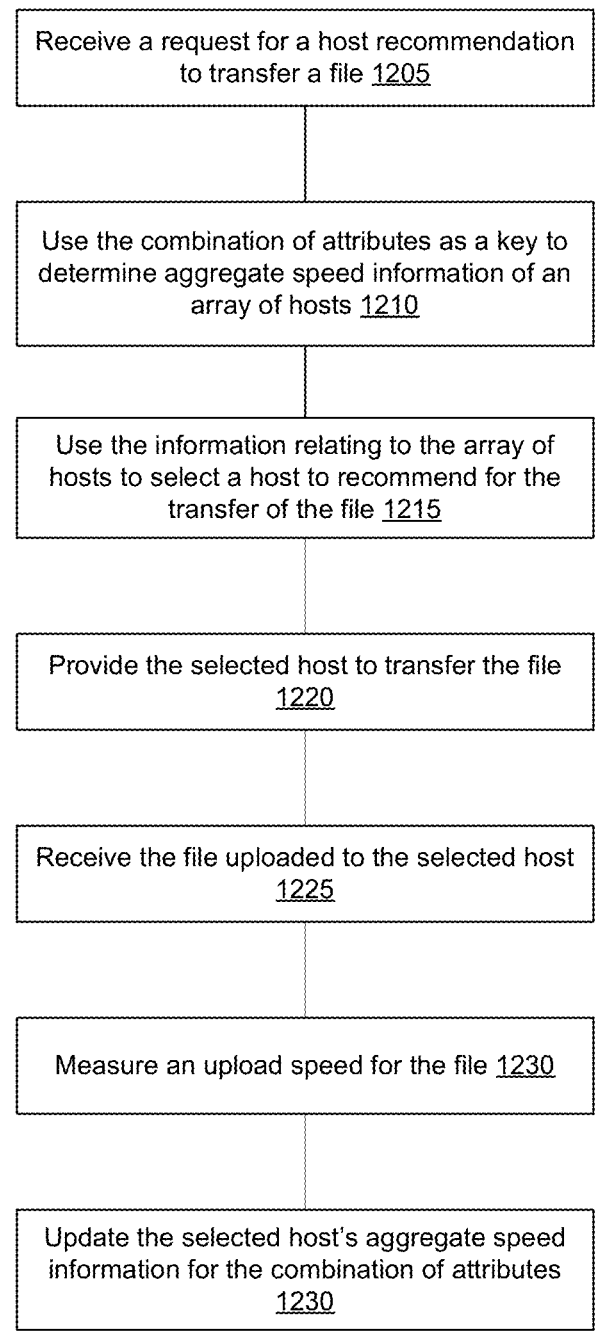
FIG. 12 illustrates an example logic flow diagram depicting a method for optimizing file transfer performance to improve user experience.

FIG. 12 illustrates an example logic flow diagram depicting a method for optimizing file transfer performance to improve user experience. In an embodiment, a request for a host recommendation to transfer a file is received by a host server (e.g., host server 100 in FIG. 1; host server 500 in FIG. 5A) at block 1205. At block 1210, a host server can use the combination of attributes as a key to determine aggregate speed information of an array of hosts. At block 1215, the host server can further use the aggregate speed information relating to the array of hosts to select a host to recommend for the transfer of the file. For example, the host server can select a host that has the fastest speed among the array of hosts. At block 1220, the host server can provide the selected host to a client device for use in transferring the file. The client device can use the selected host to upload the file. At block 1225, the host server can receive the file uploaded to the selected host. For example, when the selected host is a CDN server or an edge server, the uploaded file is forwarded by the CDN server or the edge server to the host server. When the selected host is the host server, the host server can receive the file directly. At block 1230, the host server measures an upload speed for the upload of the file. For example, the host server can measure the duration between receiving of the first byte and the last byte of the file and the size of the file to determine the upload speed. At block 1230, the host server can update the selected host's aggregate speed information for the combination of attributes. For example, the host server can log all of the data relating to the upload in an analytics datastore, and use the upload speed information to update the aggregate speed and upload count associated with the corresponding host and combination of attributes.

Figure 13:
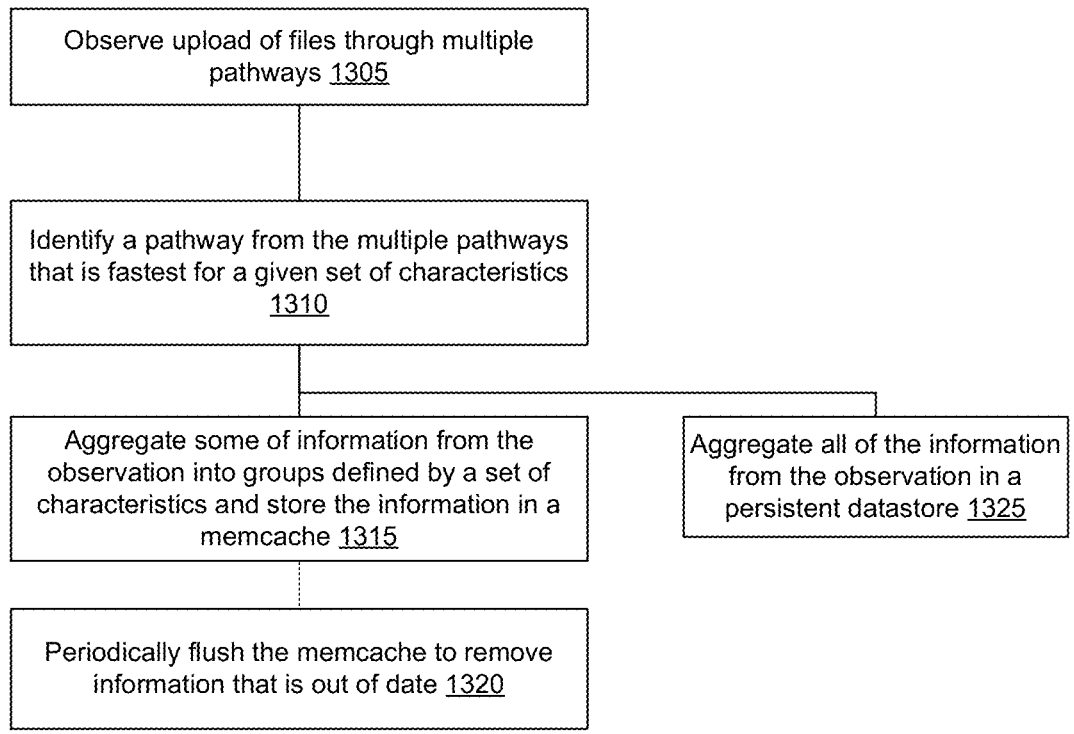
FIG. 13 illustrates an example logic flow diagram depicting a method for enhancing the upload performance.

FIG. 13 illustrates an example logic flow diagram depicting a method for enhancing the upload performance. In an embodiment, a host server (e.g., host server 100 in FIG. 1; host server 500 in FIG. 5A), observes the upload of files through multiple pathways at block 1305. Based on the observation, the host server identifies a pathway from the multiple pathways that is fastest (or most reliable, best, etc.) for a given set of characteristics at block 1310. At block 1315, the host server aggregates some of information from the observation into groups defined by a set of characteristics and stores the aggregated information in a memcache. The memcache is periodically flushed to remove information that is out of date at block 1320. At block 1325, host server can aggregate all of the information from the observation in a persistent datastore. In the case of an accidental flush of the memcache, before the information in the memcache is out of date, the host server can retrieve information from the persistent datastore to repopulate the memcache.

Figure 15:
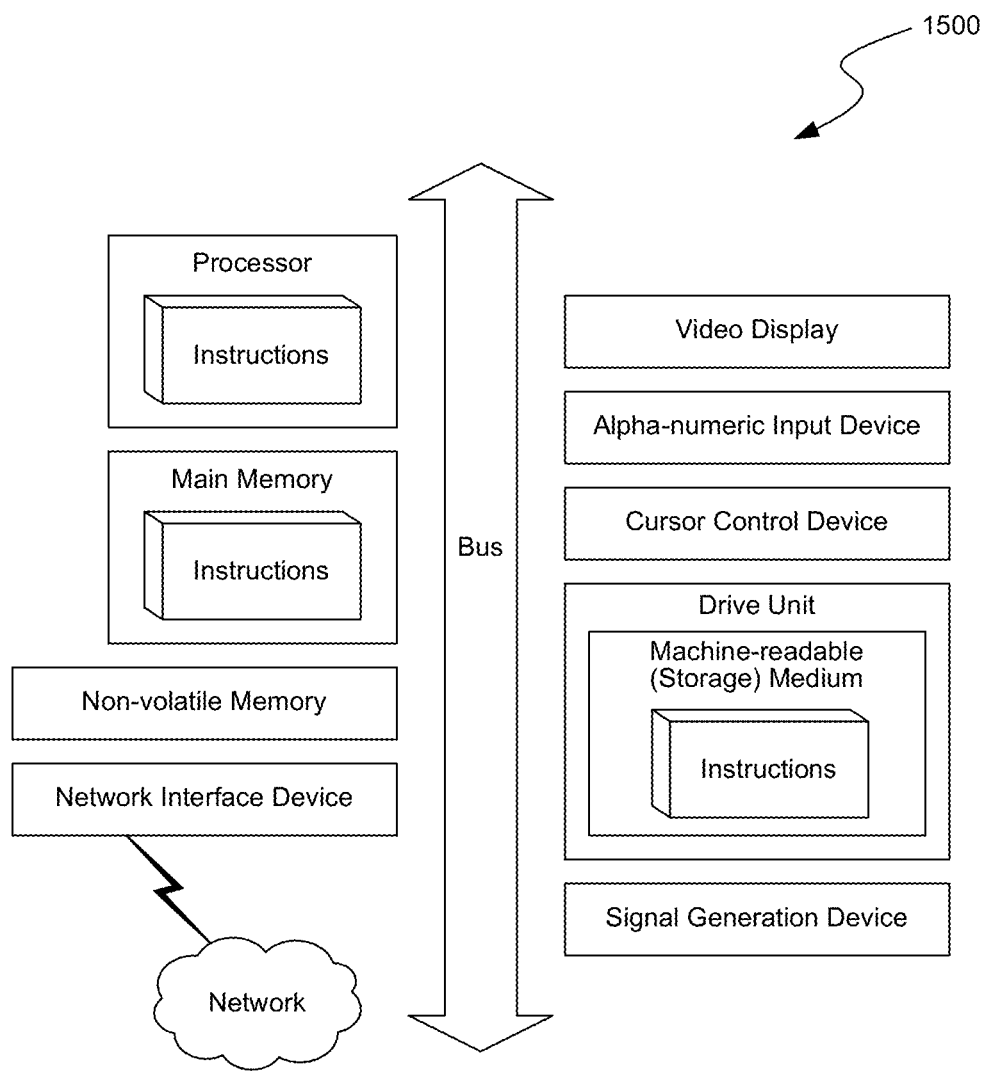
FIG. 15 shows a diagrammatic representation of a machine in the example form of a computer system within which a set of instructions, for causing the machine to perform any one or more of the methodologies discussed herein, may be executed.

FIG. 15 shows a diagrammatic representation of a machine in the example form of a computer system within which a set of instructions for causing the machine to perform any one or more of the methodologies discussed herein, may be executed.

In the example of FIG. 15, the computer system 1500 includes a processor, main memory, non-volatile memory, and an interface device. Various common components (e.g., cache memory) are omitted for illustrative simplicity. The computer system 1500 is intended to illustrate a hardware device on which any of the components depicted in the examples of FIGS. 5A-7B (and any other components described in this specification) can be implemented. The computer system 1500 can be of any applicable known or convenient type. The components of the computer system 1500 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 1500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 15 reside in the interface.

In operation, the computer system 1500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing", "computing", "calculating", "determining", "displaying", or the like, refer to the action and processes of a computer system, or similar electronic computing device that manipulates and transforms data represented as physical (electronic) quantities within the computer system's registers and memories into other data similarly represented as physical quantities within the computer system memories or registers, or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instruction sets at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs)), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements, and the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, which are not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in their implementation, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors may contemplate the various aspects of the disclosure in any number of claim forms. For example, while only one aspect of the disclosure is recited as a means-plus-function claim under 35 U.S.C. §112, ¶13, other aspects may likewise be embodied as a means-plus-function claim, or in other forms, such as being embodied in a computer-readable medium. (Any claims intended to be treated under 35 U.S.C. §112, ¶13 will begin with the words "means for"). Accordingly, the applicant reserves the right to add additional claims after filing the application to pursue such additional claim forms for other aspects of the disclosure.

The invention claimed is:

1. A method of using feedback information to optimize data transfer performance, comprising:
  detecting that a data transfer event is about to occur; and
  based on a set of characteristics associated with the data transfer event, selecting a host from a group of hosts as a pathway for transferring data associated with the data transfer event to optimize data transfer performance;
  wherein selecting the host from the group of hosts further comprises:
    retrieving an aggregation profile corresponding to the set of characteristics;
      wherein the aggregation profile is one of a plurality of aggregation profiles; and
      wherein each aggregation profile is defined by the set of characteristics and comprises an aggregate speed and a data transfer count for each of the group of hosts;
  wherein the set of characteristics comprises a partial or full Internet Protocol (IP) address, an operating system name associated with a client device.

2. The method of claim 1, wherein the data transfer event comprises a request to upload the data to a cloud-based environment or a collaboration platform.

3. The method of claim 1, wherein the data transfer event comprises a request to download the data from a cloud-based environment or a collaboration platform.

4. The method of claim 1, wherein the selected host is the fastest host among the group of hosts.

5. The method of claim 1, wherein the selected host is the most reliable host among the group of hosts.

6. The method of claim 1, wherein the data transfer event originates at the client device.

7. The method of claim 6, wherein the set of characteristics associated with the data transfer event further comprises a browser name.

8. The method of claim 1, further comprising: randomly selecting the host from the group of hosts based on weights, wherein each host in the group of hosts is accorded a weight corresponding to the host's aggregate speed.

9. The method of claim 8, wherein a host having the highest aggregate speed is selected more frequently than a host having the lowest or lower aggregate speed.

10. The method of claim 1, further comprising: determining a speed with which the data associated with the data transfer event is transferred via the selected host; and updating the aggregation profile corresponding to the set of characteristics associated with the data transfer event.

11. The method of claim 10, wherein updating the aggregation profile includes updating an aggregate speed and a data transfer count for the selected host.

12. The method of claim 1, wherein each aggregation profile includes data aggregated from multiple users over a period of time.

13. The method of claim 1, wherein the plurality of aggregation profiles are stored in a memcache, wherein the data in each of the plurality of aggregation profiles becomes out of date after a period of time.

14. The method of claim 1, wherein the group of hosts comprises at least two of: an edge server, a content delivery network server or a server hosting a cloud-based collaboration platform where the data associated with the data transfer event is stored or is to be stored.

15. A method of using feedback information to optimize upload performance, comprising:
  receiving feedback information regarding a path to upload a file;
  uploading the file to one of an array of paths based on the feedback information;
  wherein the feedback information is specific to a set of characteristics associated with a client device;
  wherein uploading the file to one of an array of paths further comprises:
    retrieving an aggregation profile corresponding to the set of characteristics;
      wherein the aggregation profile is one of a plurality of aggregation profiles; and
      wherein each aggregation profile is defined by the set of characteristics and comprises an aggregate speed and a data transfer count for each of the array of paths;
  wherein the set of characteristics comprises a partial or full IP address and an operating system name associated with a client device.

16. A system for enhancing upload performance, comprising:
  a memory;
  a processor disposed in communication with the memory, and configured to observe upload of files through multiple pathways; and
    identify a pathway from the multiple pathways that is fastest for a given set of characteristics;
  wherein identifying a pathway from the multiple pathways further comprises:
    retrieving an aggregation profile corresponding to the set of characteristics;
      wherein the aggregation profile is one of a plurality of aggregation profiles; and
      wherein each aggregation profile is defined by the set of characteristics and comprises an aggregate speed and a data transfer count for each of the multiple pathways;
    wherein the set of characteristics comprises a partial or full IP address and an operating system name associated with a client device.

17. The system of claim 16, wherein the upload of files through the multiple pathways originates from multiple client devices, each of which has an associated set of characteristics.

18. The system of claim 16, wherein the set of characteristics comprises a partial or full Internet Protocol (IP) address, browser information and operating system information.

19. The system of claim 16, further configured to:
aggregate some of information from the observation into groups,
wherein each group is defined by a set of characteristics, and
wherein the aggregated information is stored in a memcache.

20. The system of claim 19, wherein the aggregated information stored in the memcache becomes invalid after a period of time.

21. The system of claim 19, further configured to:
aggregate all of the information from the observation in a persistent datastore, wherein the information in the persistent datastore is used to repopulate the memcache in the event that the aggregated information stored in the memcache is lost.

\* \* \* \* \*